(12) United States Patent
Matzner et al.

(10) Patent No.: US 11,318,670 B2
(45) Date of Patent: May 3, 2022

(54) ADDITIVE MANUFACTURING OF RUBBER-LIKE MATERIALS

(71) Applicant: Stratasys Ltd., Rehovot (IL)

(72) Inventors: Eynat Matzner, Adi (IL); Shiran Lupo, Yokneam Ilit (IL); Shai Hirsch, Rehovot (IL); Ophira Melamed, Shoham (IL)

(73) Assignee: Stratasys Ltd., Rehovot (IL)

( * ) Notice: Subject to any disclaimer, the term of this patent is extended or adjusted under 35 U.S.C. 154(b) by 274 days.

(21) Appl. No.: 16/305,094

(22) PCT Filed: May 29, 2017

(86) PCT No.: PCT/IL2017/050604
§ 371 (c)(1),
(2) Date: Nov. 28, 2018

(87) PCT Pub. No.: WO2017/208238
PCT Pub. Date: Dec. 7, 2017

(65) Prior Publication Data
US 2019/0224914 A1    Jul. 25, 2019

Related U.S. Application Data

(60) Provisional application No. 62/342,970, filed on May 29, 2016.

(51) Int. Cl.
*B29C 64/165* (2017.01)
*B33Y 70/00* (2020.01)
(Continued)

(52) U.S. Cl.
CPC .......... *B29C 64/165* (2017.08); *B29C 64/106* (2017.08); *B33Y 10/00* (2014.12);
(Continued)

(58) Field of Classification Search
CPC .. B29C 64/106; B29C 64/165; B29K 2021/00
See application file for complete search history.

(56) References Cited

U.S. PATENT DOCUMENTS 6,259,962 B1    7/2001    Gothait
6,569,373 B2    5/2003    Napadensky
(Continued)

FOREIGN PATENT DOCUMENTS

CN    102037064    4/2011
CN    105637035    6/2016
(Continued)

OTHER PUBLICATIONS

International Preliminary Report on Patentability dated Dec. 13, 2018 From the International Bureau of WIPO Re. Application No. PCT/IL2017/050604. (8 Pages).
(Continued)

*Primary Examiner* — James Sanders

(57) ABSTRACT

Methods of fabricating three-dimensional rubber-like objects which utilize one or more modeling material formulations which comprise an elastomeric curable material and silica particles are provided. Objects made of the modeling material formulations and featuring improved mechanical properties are also provided.

10 Claims, 11 Drawing Sheets
(6 of 11 Drawing Sheet(s) Filed in Color)

(51) Int. Cl.
- B29C 64/106 (2017.01)
- C08F 220/68 (2006.01)
- B33Y 10/00 (2015.01)
- B29K 21/00 (2006.01)
- B33Y 30/00 (2015.01)
- B33Y 80/00 (2015.01)
- B29K 509/02 (2006.01)

(52) U.S. Cl.
CPC ............ *B33Y 70/00* (2014.12); *C08F 220/68* (2013.01); *B29K 2021/00* (2013.01); *B29K 2509/02* (2013.01); *B29K 2995/0081* (2013.01); *B33Y 30/00* (2014.12); *B33Y 80/00* (2014.12)

(56) References Cited

U.S. PATENT DOCUMENTS

| | | | |
|---|---|---|---|
| 6,658,314 | B1 | 12/2003 | Gothait |
| 6,850,334 | B1 | 2/2005 | Gothait |
| 7,183,335 | B2 | 2/2007 | Nepadensky |
| 7,209,797 | B2 | 4/2007 | Kritchman et al. |
| 7,225,045 | B2 | 5/2007 | Gothait et al. |
| 7,300,619 | B2 | 11/2007 | Napadensky et al. |
| 7,479,510 | B2 | 1/2009 | Napadensky et al. |
| 7,500,846 | B2 | 3/2009 | Eshed et al. |
| 7,962,237 | B2 | 6/2011 | Kritchman |
| 2002/0149659 | A1* | 10/2002 | Wu .................... C09D 11/101 347/102 |
| 2010/0191360 | A1 | 7/2010 | Napadensky et al. |
| 2013/0040091 | A1 | 2/2013 | Dikovsky et al. |
| 2013/0073068 | A1 | 3/2013 | Napadensky |
| 2014/0016730 | A1 | 6/2014 | Lee |

FOREIGN PATENT DOCUMENTS

| | | |
|---|---|---|
| EP | 1496587 | 1/2005 |
| EP | 2123706 | 11/2009 |
| EP | 3059284 | 8/2016 |
| JP | 06-042506 | 2/1994 |
| JP | 2001-057988 | 3/2001 |
| JP | 2002-512645 | 4/2002 |
| JP | 2007-504975 | 3/2007 |
| JP | 2008-243897 | 10/2008 |
| JP | 2014-2520 | 1/2014 |
| KR | 0704388 | 3/2007 |
| KR | 2011-0014154 | 2/2011 |
| WO | WO 98/41385 | 9/1998 |
| WO | WO 2005/02583 | 3/2005 |
| WO | WO 2007/001937 | 1/2007 |
| WO | WO 2015/056483 | 4/2015 |
| WO | WO 2017/089496 | 6/2017 |
| WO | WO 2017/208238 | 12/2017 |

OTHER PUBLICATIONS

International Search Report and the Written Opinion dated Sep. 13, 2017 From the International Searching Authority Re. Application No. PCT/IL2017/050604. (14 Pages).
Notification of Office Action and Search Report dated May 28, 2020 From the State Intellectual Property Office of the People's Republic of China Re. Application No. 201780045332.3 and its Summary in English. (13 Pages).
Translation Dated Jul. 1, 2020 of Notification of Office Action dated May 28, 2020 From the State Intellectual Property Office of the People's Republic of China Re. Application No. 201780045332.3. (11 Pages).
Grounds of Reason of Rejection dated Mar. 8, 2021 From the Korean Intellectual Property Office Re. Application No. 2018-7038231. (8 Pages).
Translation Dated Mar. 24, 2021 of Grounds of Reason of Rejection dated Mar. 8, 2021 From the Korean Intellectual Property Office Re. Application No. 2018-7038231. (8 Pages).
Notice of Reason(s) for Rejection dated Mar. 16, 2021 From the Japan Patent Office Re. Application No. 2018-562544 and its Translation Into English. (13 Pages).
Invitation Pursuant to Rule 137(4) EPC and Article 94(3) EPC Dated May 14, 2021 From the European Patent Office Re. Application No. 17736772.9. (3 Pages).
Notice of Reason(s) for Rejection dated Oct. 1, 2021 From the Japan Patent Office Re. Application No. 2018-562544 and its Translation Into English. (7 Pages).
Office Action dated Feb. 17, 2022 From the Israel Patent Office Re. Application No. 263376. (4 Pages).

\* cited by examiner

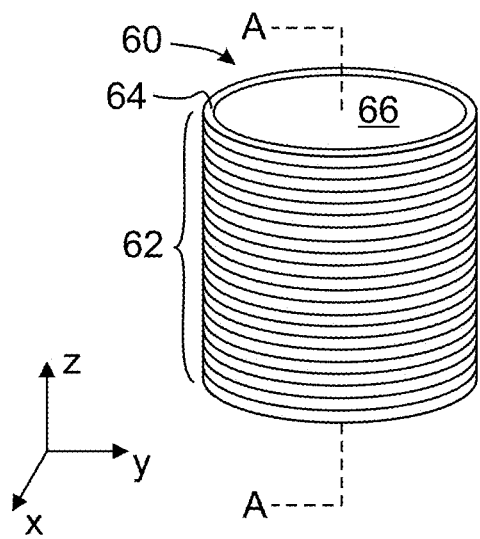
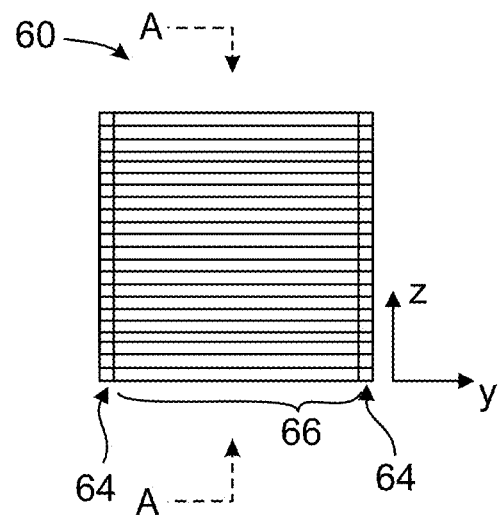
FIG. 5A  FIG. 5B
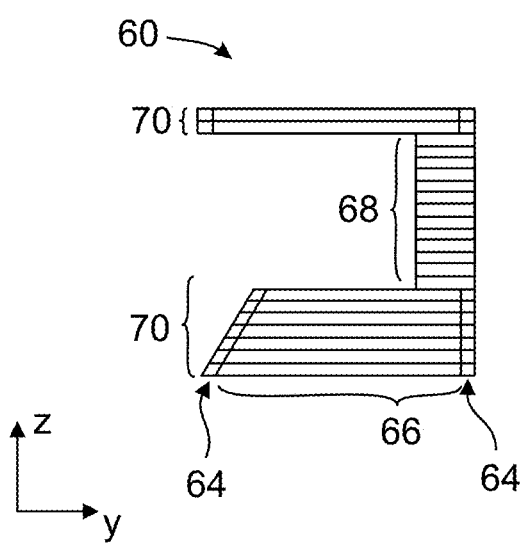
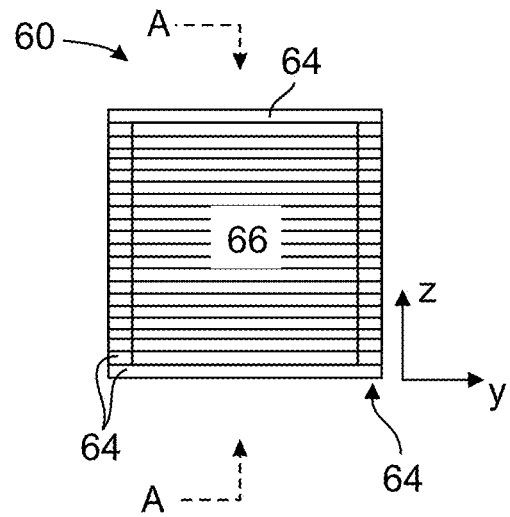
FIG. 5C  FIG. 5D

ADDITIVE MANUFACTURING OF RUBBER-LIKE MATERIALS

RELATED APPLICATIONS

This application is a National Phase of PCT Patent Application No. PCT/IL2017/050604 having International filing date of May 29, 2017, which claims the benefit of priority under 35 USC § 119(e) of U.S. Provisional Patent Application No. 62/342,970 filed May 29, 2016. The contents of the above applications are all incorporated by references as if fully set forth herein in their entirety.

FIELD AND BACKGROUND OF THE INVENTION

The present invention, in some embodiments thereof, relates to additive manufacturing (AM), and, more particularly, but not exclusively, to formulations and methods usable in additive manufacturing of an object made, in at least a portion thereof, of rubber-like material(s).

Synthetic rubbers are typically made of artificial elastomers. An elastomer is a viscoelastic polymer, which generally exhibits low Young's modulus and high yield strain compared with other materials. Elastomers are typically amorphous polymers existing above their glass transition temperature, so that considerable segmental motion is possible. At ambient temperatures, rubbers are thus relatively soft, featuring elasticity of about 3 MPa, and deformable.

Elastomers are usually thermosetting polymers (or copolymers), which require curing (vulcanization) for cross-linking the polymer chains. The elasticity is derived from the ability of the long chains to reconfigure themselves to distribute an applied stress. The covalent cross-linking ensures that the elastomer will return to its original configuration when the stress is removed. Elastomers can typically reversibly extend from 5% to 700%.

Rubbers often further include fillers or reinforcing agents, usually aimed at increasing their hardness. Most common reinforcing agents include finely divided carbon black and/or finely divided silica.

Both carbon black and silica, when added to the polymeric mixture during rubber production, typically at a concentration of about 30 percent by volume, raise the elastic modulus of the rubber by a factor of two to three, and also confer remarkable toughness, especially resistance to abrasion, to otherwise weak materials. If greater amounts of carbon black or silica particles are added, the modulus is further increased, but the tensile strength may be lowered.

Additive manufacturing is generally a process in which a three-dimensional (3D) object is manufactured utilizing a computer model of the objects. Such a process is used in various fields, such as design related fields for purposes of visualization, demonstration and mechanical prototyping, as well as for rapid manufacturing (RM).

The basic operation of any AM system consists of slicing a three-dimensional computer model into thin cross sections, translating the result into two-dimensional position data and feeding the data to control equipment which manufacture a three-dimensional structure in a layerwise manner.

Various AM technologies exist, amongst which are stereolithography, digital light processing (DLP), and three dimensional (3D) printing, 3D inkjet printing in particular. Such techniques are generally performed by layer by layer deposition and solidification of one or more building materials, typically photopolymerizable (photocurable) materials.

In three-dimensional printing processes, for example, a building material is dispensed from a dispensing head having a set of nozzles to deposit layers on a supporting structure. Depending on the building material, the layers may then be cured or solidified using a suitable device.

Various three-dimensional printing techniques exist and are disclosed in, e.g., U.S. Pat. Nos. 6,259,962, 6,569,373, 6,658,314, 6,850,334, 7,183,335, 7,209,797, 7,225,045, 7,300,619, 7,479,510, 7,500,846, 7,962,237 and 9,031,680, all of the same Assignee, the contents of which are hereby incorporated by reference.

A printing system utilized in additive manufacturing may include a receiving medium and one or more printing heads. The receiving medium can be, for example, a fabrication tray that may include a horizontal surface to carry the material dispensed from the printing head. The printing head may be, for example, an ink jet head having a plurality of dispensing nozzles arranged in an array of one or more rows along the longitudinal axis of the printing head. The printing head may be located such that its longitudinal axis is substantially parallel to the indexing direction. The printing system may further include a controller, such as a microprocessor to control the printing process, including the movement of the printing head according to a pre-defined scanning plan (e.g., a CAD configuration converted to a Stereo Lithography (STL) format and programmed into the controller). The printing head may include a plurality of jetting nozzles. The jetting nozzles dispense material onto the receiving medium to create the layers representing cross sections of a 3D object.

In addition to the printing head, there may be a source of curing energy, for curing the dispensed building material. The curing energy is typically radiation, for example, UV radiation.

Additionally, the printing system may include a leveling device for leveling and/or establishing the height of each layer after deposition and at least partial solidification, prior to the deposition of a subsequent layer.

The building materials may include modeling materials and support materials, which form the object and the temporary support constructions supporting the object as it is being built, respectively.

The modeling material (which may include one or more material(s)) is deposited to produce the desired object/s and the support material (which may include one or more material(s)) is used, with or without modeling material elements, to provide support structures for specific areas of the object during building and assure adequate vertical placement of subsequent object layers, e.g., in cases where objects include overhanging features or shapes such as curved geometries, negative angles, voids, and so on.

Both the modeling and support materials are preferably liquid at the working temperature at which they are dispensed, and subsequently hardened, typically upon exposure to curing energy (e.g., UV curing), to form the required layer shape. After printing completion, support structures are removed to reveal the final shape of the fabricated 3D object.

Several additive manufacturing processes allow additive formation of objects using more than one modeling material. For example, U.S. patent application having Publication No. 2010/0191360, of the present Assignee, discloses a system which comprises a solid freeform fabrication apparatus having a plurality of dispensing heads, a building material supply apparatus configured to supply a plurality of building materials to the fabrication apparatus, and a control unit configured for controlling the fabrication and supply apparatus. The system has several operation modes. In one mode, all dispensing heads operate during a single building scan cycle of the fabrication apparatus. In another mode, one or more of the dispensing heads is not operative during a single building scan cycle or part thereof.

In a 3D inkjet printing process such as POLYJET™ (Stratasys Ltd., Israel), the building material is selectively jetted from one or more printing heads and deposited onto a fabrication tray in consecutive layers according to a predetermined configuration as defined by a software file.

U.S. Pat. No. 9,227,365, by the present assignee, discloses methods and systems for solid freeform fabrication of shelled objects, constructed from a plurality of layers and a layered core constituting core regions and a layered shell constituting envelope regions.

Additive Manufacturing processes have been used to form rubber-like materials. For example, rubber-like materials are used in POLYJET™ systems as described herein. These materials are formulated to have relatively low viscosity permitting dispensing, for example by inkjet, and to develop Tg which is lower than room temperature, e.g., −10° C. or lower. The latter is obtained by formulating a product with relatively low degree of cross-linking and by using monomers and oligomers with intrinsic flexible molecular structure (e.g., acrylic elastomers).

An exemplary family of Rubber-like materials usable in POLYJET™ systems (marketed under the trade name "Tango" family) offers a variety of elastomer characteristics, including Shore scale A hardness, elongation at break, Tear Resistance and tensile strength.

Rubber-like materials are useful for many modeling applications including: Exhibition and communication models; Rubber surrounds and over-molding; Soft-touch coatings and nonslip surfaces for tooling or prototypes; and Knobs, grips, pulls, handles, gaskets, seals, hoses, footwear.

SUMMARY OF THE INVENTION

In conventional production of elastomeric materials (elastomers, rubber-like materials), the starting material is typically a thermoplastic polymer with low Tg, which is compounded and cured or vulcanized to achieve the desired final properties. In contrast, in additive manufacturing processes such as 3D (inkjet) printing, a cured polymer is produced in one stage from suitable monomers and/or low molecular weight cross-linkers and oligomers. Controlling the molecular weight, cross linking density and mechanical properties of the obtained rubber-like materials in such processes is therefore challenging. Thus, for example, POLYJET™ rubber-like materials are often characterized by low Tear Resistance (TR) value and/or slow return velocity after deformation, when compared, for example, to conventional elastomers. POLYJET™ rubber-like materials which exhibit high elongation are often characterized by low modulus, low Tear Resistance and/or low Tg and tackiness.

The present inventors have now uncovered that utilizing various types of nano-sized silica particles, including, for example, finely-divided hydrophilic silica, hydrophobic silica and acrylic-coated silica, in the manufacture of rubber-like materials, yields rubber-like materials with improved mechanical properties. The present inventors have shown that using such a methodology, rubber-like materials featuring, simultaneously, improved elongation, modulus and Tear Resistance, can be obtained.

According to an aspect of some embodiments of the present invention there is provided a method of additive manufacturing of a three-dimensional object made of an elastomeric material, the method comprising sequentially forming a plurality of layers in a configured pattern corresponding to the shape of the object, thereby forming the object, wherein the formation of each of at least a few of the layers comprises dispensing at least one modeling material formulation, and exposing the dispensed modeling material to curing energy to thereby form a cured modeling material, the at least one modeling material formulation comprising an elastomeric curable material and silica particles.

According to some of any of the embodiments described herein, the silica particles have an average particle size lower than 1 micron.

According to some of any of the embodiments described herein, at least a portion of the silica particles feature a hydrophilic surface.

According to some of any of the embodiments described herein, at least a portion of the silica particles feature a hydrophobic surface.

According to some of any of the embodiments described herein, at least a portion of the silica particles comprise functionalized silica particles.

According to some of any of the embodiments described herein, at least a portion of the silica particles are functionalized by curable functional groups (e.g., (meth)acrylate groups).

According to some of any of the embodiments described herein, an amount of the silica particles in the modeling material formulation ranges from about 1% to about 20%, or from about 1% to about 15%, or from about 1% to about 10%, by weight, of the total weight of a modeling material formulation comprising the particles.

According to some of any of the embodiments described herein, an amount of the silica particles in the modeling material formulation ranges from about 1% to about 20%, or from about 1% to about 15%, or from about 1% to about 10%, by weight, of the total weight of the one or more modeling material formulation(s) or of a formulation system as described herein.

According to some of any of the embodiments described herein, a weight ratio of the elastomeric curable material and the silica particles ranges from about 30:1 to about 4:1.

According to some of any of the embodiments described herein, an amount of the elastomeric curable material is at least 40%, or at last 50%, by weight, of a total weight of a modeling material formulation comprising the material.

According to some of any of the embodiments described herein, an amount of the elastomeric curable material is at least 40%, or at last 50%, by weight, of a total weight of the one or more modeling material formulation(s) or of a formulation system as described herein.

According to some of any of the embodiments described herein, the elastomeric curable material is selected from mono-functional elastomeric curable monomer, mono-functional elastomeric curable oligomer, multi-functional elastomeric curable monomer, multi-functional elastomeric curable oligomer, and any combination thereof.

According to some of any of the embodiments described herein, the elastomeric curable material and the silica particles are in the same modeling material formulation.

According to some of any of the embodiments described herein, the at least one modeling material formulation further comprises at least one additional curable material.

According to some of any of the embodiments described herein, the additional curable material is selected from a mono-functional curable monomer, a mono-functional curable oligomer, a multi-functional curable monomer, a multi-functional curable oligomer and any combination thereof.

According to some of any of the embodiments described herein, the elastomeric curable material, the silica particles and the additional curable material are in the same modeling material formulation.

According to some of any of the embodiments described herein, the dispensing is of one modeling material formulation.

According to some of any of the embodiments described herein, the dispensing is of two or more modeling material formulations.

According to some of any of the embodiments described herein, the dispensing is of at least two modeling material formulations and wherein one of the formulations comprises the elastomeric curable material and another formulation comprises the additional curable material.

According to some of any of the embodiments described herein, the at least one modeling material formulation further comprises at least one additional, non-curable material, for example, one or more of a colorant, an initiator, a dispersant, a surfactant, a stabilizer and an inhibitor.

According to some of any of the embodiments described herein, the elastomeric curable material is a UV-curable elastomeric material.

According to some of any of the embodiments described herein, the curing energy comprises UV irradiation.

According to some of any of the embodiments described herein, the elastomeric curable material is an acrylic elastomer.

According to some of any of the embodiments described herein, the at least modeling material formulation is characterized, when hardened, by Tear Resistance of at least 4,000 N/m.

According to some of any of the embodiments described herein, the at least modeling material formulation is characterized, when hardened, by Tear Resistance higher by at least 500 N/m than a cured modeling material devoid of the silica particles.

According to some of any of the embodiments described herein, the at least modeling material formulation is characterized, when hardened, by Tensile Strength of at least 2 MPa.

According to some of any of the embodiments described herein, the at least one modeling material formulation is such that an object consisting of the cured modeling material and featuring two O-rings and a tube connecting the rings, such as, for example, depicted in FIGS. 6A-C, is characterized by Tear Resistance under constant elongation of at least one hour, or at least one day.

According to some of any of the embodiments described herein, the dispensing is of at least two modeling material formulations and is in a voxelated manner, wherein voxels of one of the modeling material formulations are interlaced with voxels of at least one another modeling material formulation.

According to some of any of the embodiments described herein, the dispensing is of at least two modeling material formulations, and is such that forms a core region and one or more envelope regions at least partially surrounding the core region, to thereby fabricate an object constructed from a plurality of layers and a layered core constituting core regions and a layered shell constituting envelope regions.

According to some of any of the embodiments described herein, the one or more envelope regions comprise(s) a plurality of envelope regions.

According to some of any of the embodiments described herein, dispensing the layers further comprises dispensing a support material formulation.

According to some of any of the embodiments described herein, the method further comprises, subsequent to the exposing, removing the support material.

According to an aspect of some embodiments of the present invention there is provided a three-dimensional object prepared by the method as described herein in any of the respective embodiments, the object featuring at least one portion which comprises an elastomeric material.

According to an aspect of some embodiments of the present invention there is provided a formulation system comprising a curable elastomeric material and silica particles, as described herein in any of the respective embodiments, the formulation system comprising one or more formulations.

According to some of any of the embodiments described herein, an amount of the silica particles in the formulation system ranges from 1 to 20, or from 1 to 15, or from 1 to 10, weight percent, of the total weight of the formulation system.

According to some of any of the embodiments described herein, a weight ratio of a total weight of the elastomeric curable material and a total weight of the silica particles, in the formulation system, ranges from 30:1 to 4:1.

According to some of any of the embodiments described herein, an amount of the elastomeric curable material in the formulation system is at least 40%, or at least 50%, by weight, of the total weight of the formulation system.

According to some of any of the embodiments described herein, the elastomeric curable material is selected from a mono-functional elastomeric curable monomer, a mono-functional elastomeric curable oligomer, a multi-functional elastomeric curable monomer, a multi-functional elastomeric curable oligomer, and any combination thereof.

According to some of any of the embodiments described herein, the elastomeric curable material and the silica particles are in the same formulation.

According to some of any of the embodiments described herein, the formulation system further comprises at least one additional curable material.

According to some of any of the embodiments described herein, the additional curable material is selected from a mono-functional curable monomer, a mono-functional curable oligomer, a multi-functional curable monomer, a multi-functional curable oligomer and any combination thereof.

According to some of any of the embodiments described herein, the elastomeric curable material, the silica particles and the additional curable material are in the same formulation.

According to some of any of the embodiments described herein, the formulation system comprises one formulation.

According to some of any of the embodiments described herein, the formulation system comprises two or more formulations.

According to some of any of the embodiments described herein, the formulation system comprises at least two formulations, wherein one of the formulations comprises the elastomeric curable material and another formulation comprises the additional curable material.

According to some of any of the embodiments described herein, the formulation system further comprises at least one additional, non-curable material.

According to some of any of the embodiments described herein, the non-curable material is selected from a colorant, an initiator, a dispersant, a surfactant, a stabilizer, an inhibitor, and any combination thereof.

According to some of any of the embodiments described herein, the formulation system comprises at least one elastomeric mono-functional curable material, at least one elastomeric multi-functional curable material and at least additional mono-functional curable material.

According to some of any of the embodiments described herein, a total concentration of the curable mono-functional material ranges from 10% to 30%, by weight of the total weight of the formulation system.

According to some of any of the embodiments described herein, a total concentration of the elastomeric mono-functional curable material ranges from 50% to 70%, by weight of the total weight of the formulation system.

According to some of any of the embodiments described herein, a total concentration of the elastomeric multi-functional curable material ranges from 10% to 20%, by weight, of the total weight of the formulation system.

According to some of any of the embodiments described herein, a total concentration of the curable mono-functional material ranges from 10% to 30%, by weight; a total concentration of the elastomeric mono-functional curable material ranges from 50% to 70%, by weight; and a total concentration of the elastomeric multi-functional curable material ranges from 10% to 20%, by weight, of the total weight of the formulation system.

According to some of any of the embodiments described herein, a total concentration of the curable mono-functional material ranges from 20% to 30%, by weight, of the total weight of the formulation system.

According to some of any of the embodiments described herein, a total concentration of the elastomeric mono-functional curable material ranges from 30% to 50%, by weight, of the total weight of the formulation system.

According to some of any of the embodiments described herein, a total concentration of the elastomeric multi-functional curable material ranges from 10% to 30%, by weight, of the total weight of the formulation system.

According to some of any of the embodiments described herein, a total concentration of the curable mono-functional material ranges from 20% to 30%, by weight; a total concentration of the elastomeric mono-functional curable material ranges from 30% to 50%, by weight; and a total concentration of the elastomeric multi-functional curable material ranges from 10% to 30%, by weight, of the total weight of the formulation system.

According to some of any of the embodiments described herein, the elastomeric curable material is a UV-curable elastomeric material.

According to some of any of the embodiments described herein, the elastomeric curable material is an acrylic elastomer.

According to some of any of the embodiments described herein, the formulation system as described herein in any of the respective embodiments is for use in additive manufacturing of a three-dimensional object, as a modeling material formulation system.

According to an aspect of some embodiments of the present invention there is provided a kit comprising the formulation system as described herein in any of the respective embodiments.

According to some of any of the embodiments described herein, the formulation system comprises at least two formulations, and wherein each of the formulations is individually packaged within the kit.

According to some of any of the embodiments described herein, the formulation system provides, when hardened, a material characterized by Tear Resistance of at least 4,000 N/m.

According to some of any of the embodiments described herein, the formulation system provides, when hardened, a material characterized by Tear Resistance higher by at least 500 N/m than a hardened material devoid of the silica particles.

According to some of any of the embodiments described herein, the formulation system provides, when hardened, a material characterized by Tensile Strength of at least 2 MPa.

According to some of any of the embodiments described herein, an object consisting of the formulation, when hardened, and featuring two O-rings and a tube connecting the rings, is characterized by Tear Resistance under constant elongation of at least one hour, or at least one day.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 1A-D are schematic illustrations of a representative and non-limiting example of a system suitable for additive manufacturing according to some embodiments of the present invention;

FIGS. 2A-C are schematic illustrations of dispensing heads according to some embodiments of the present invention;

Figure 6A:
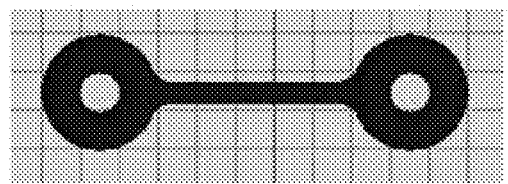
Figure 6B:
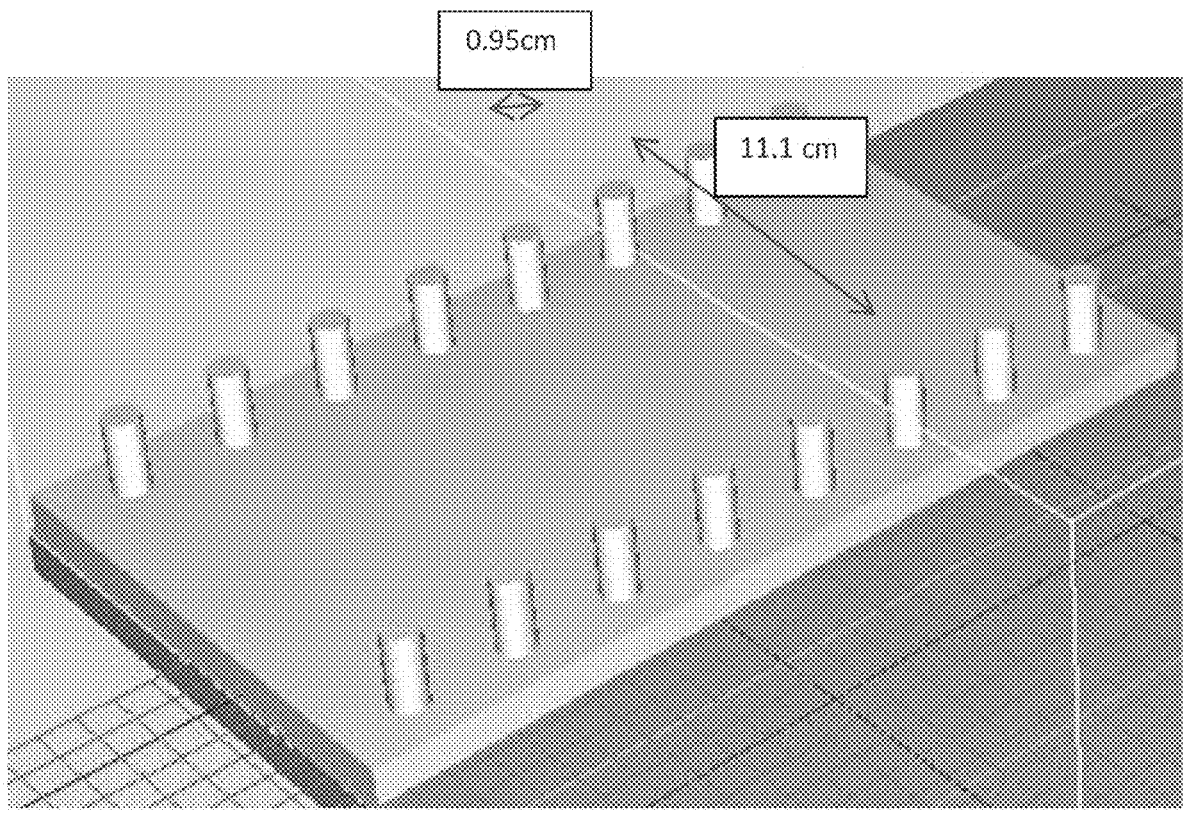
Figure 6C:
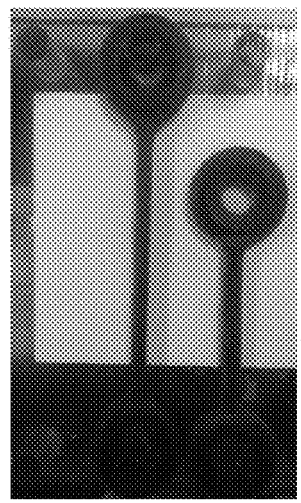
Figure 7:
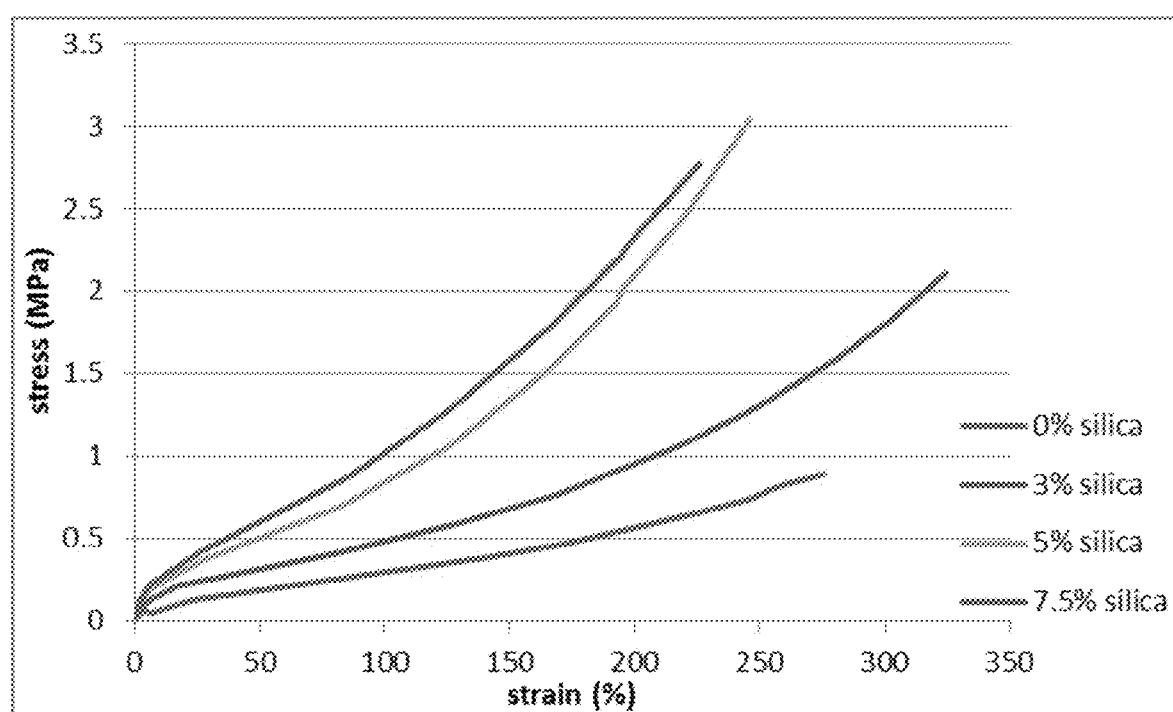
Figure 8:
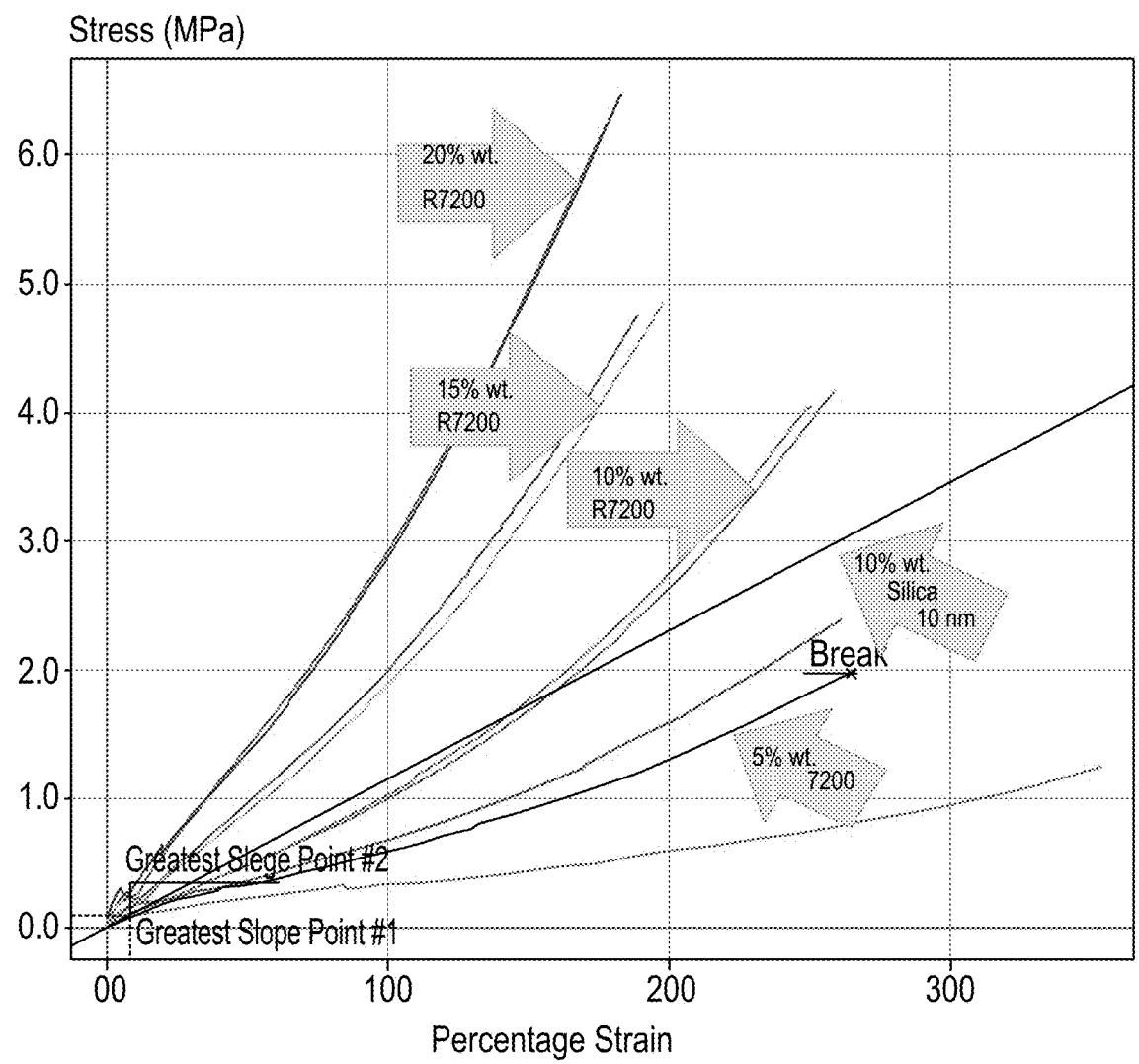
Figure 9:
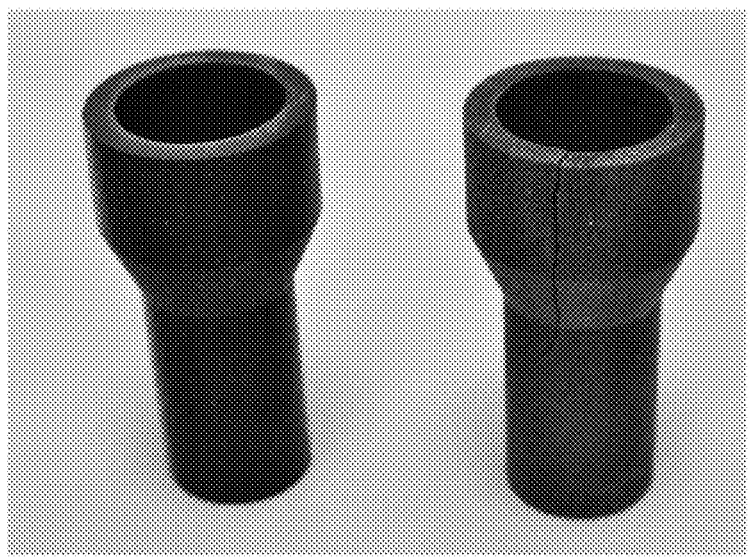

FIGS. 5A-D are schematic illustrations of a representative and non-limiting example of a structure according to some embodiments of the present invention;

FIGS. 6A-C present schematic illustrations of an object (FIG. 6A) and a stretching device (FIG. 6B) used in measuring static Tear Resistance in the O-Ring test, according to some embodiments of the present invention, and a photograph presenting an exemplary such assay before (right object) and after (left object) subjecting the sample to elongation stress (FIG. 6C);

FIG. 7 presents comparative plots showing the effect of various concentrations of a hydrophobic, acrylic coated fumed silica, silica R7200, on the stress-strain curves of a 3D inkjet-printed object made of a rubbery material obtained from the respective formulation;

FIG. 8 presents comparative plots showing the effect of various concentrations of a hydrophobic, acrylic coated fumed silica, silica R7200, and of 10% (hydrophilic) colloidal silica (silica nanopowder), on the stress-strain curves of 3D inkjet-printed object made of a rubbery material obtained from the respective formulation;

FIG. 9 presents a water pipe connector printed using an exemplary formulation according to some embodiments of the present invention (left tube) and a water pipe connector printed using a formulation which does not contain silica (right tube), upon being fitted on a water tube for 10 hours.

DESCRIPTION OF SPECIFIC EMBODIMENTS OF THE INVENTION

The present invention, in some embodiments thereof, relates to additive manufacturing (AM), and, more particularly, but not exclusively, to formulations and methods usable in additive manufacturing of an object made, in at least a portion thereof, of rubber-like material(s).

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As discussed hereinabove, in contrast to conventional production of elastomeric materials, in additive manufacturing processes such as 3D (inkjet) printing, a cured polymer is produced in one stage from suitable curable components, rendering the control of chemical and mechanical properties of the obtained rubber-like materials in such processes challenging. Thus, current technologies for additive manufacturing often result in rubber-like materials characterized by low Tear Resistance (TR) value and/or slow return velocity after deformation, when compared, for example, to conventional elastomers, whereby rubber-like materials which exhibit high elongation are often characterized by low modulus, low Tear Resistance and/or low Tg and tackiness.

The present inventors have now uncovered that utilizing various types of sub-micron (e.g., nano-sized) silica particles, including, for example, finely-divided hydrophilic silica, hydrophobic silica and functionalized (e.g., acrylic-coated) silica, in additive manufacturing (e.g., 3D inkjet printing) of rubber-like materials, yields rubber-like materials with improved mechanical properties. The present inventors have shown that using such a methodology, rubber-like materials featuring, simultaneously, improved elongation, elastic modulus and Tear Resistance, can be obtained.

As demonstrated in the Examples section that follows, adding sub-micron silica particles to formulations currently practiced in 3D inkjet printing of rubber-like materials results in printed objects featuring Tear Resistance higher by at least 500 N/m, and elastic modulus higher by at least 2-folds, compared to objects made of currently practiced formulations, and by a substantial improvement in resistance to tear under constant elongation, from a few minutes/hours to several days, without compromising, and even improving, other properties, such as elongation and tensile strength. Such improved mechanical properties were demonstrated upon utilizing silica particles in an amount of up to 10% by weight, of the total weight of the formulation.

Referring now to the drawings, FIGS. 1A-5D present schematic illustrations of exemplary systems, methods and structures according to some embodiments of the present invention. FIGS. 6A-C present schematic illustrations and a photograph showing measurements of Tear Resistance under constant elongation; FIGS. 7 and 8 show that addition of increased amounts of acrylic-coated silica particles results in increased elastic modulus of the obtained rubber-like material. FIG. 9 presents photographs showing the improved Tear Resistance of rubber-like materials made of formulations containing silica particles, according to some embodiments of the present invention, upon usage in water tubes. Tables 1-4 in the Examples section that follows further present the improved mechanical properties of rubber-like materials obtained in 3D inkjet printing of formulations containing silica particles.

Herein throughout, the phrases "rubber", "rubbery materials", "elastomeric materials" and "elastomers" are used interchangeably to describe materials featuring characteristics of elastomers. The phrase "rubbery-like material" or "rubber-like material" is used to describe materials featuring characteristics of rubbers, prepared by additive manufacturing (e.g., 3D inkjet printing) rather than conventional processes that involve vulcanization of thermoplastic polymers.

The term "rubbery-like material" is also referred to herein interchangeably as "elastomeric material".

Elastomers, or rubbers, are flexible materials that are characterized by low Tg (e.g., lower than room temperature, preferably lower than 10° C., lower than 0° C. and even lower than −10° C.).

The following describes some of the properties characterizing rubbery materials, as used herein and in the art.

Shore A Hardness, which is also referred to as Shore hardness or simply as hardness, describes a material's resistance to permanent indentation, defined by type A durometer scale. Shore hardness is typically determined according to ASTM D2240.

Elastic Modulus, which is also referred to as Modulus of Elasticity or as Young's Modulus, or as Tensile modulus, or "E", describes a material's resistance to elastic deformation when a force is applied, or, in other words, as the tendency of an object to deform along an axis when opposing forces are applied along that axis. Elastic modulus is typically measured by a tensile test (e.g., according to ASTM D 624) and is determined by the linear slope of a Stress-Strain curve in the elastic deformation region, wherein Stress is the force causing the deformation divided by the area to which the force is applied and Strain is the ratio of the change in some length parameter caused by the deformation to the original value of the length parameter. The stress is proportional to the tensile force on the material and the strain is proportional to its length.

Tensile Strength describes a material's resistance to tension, or, in other words, its capacity to withstand loads tending to elongate, and is defined as the maximum stress in MPa, applied during stretching of an elastomeric composite before its rupture. Tensile strength is typically measured by a tensile test (e.g., according to ASTM D 624) and is determined as the highest point of a Stress-Strain curve, as described herein and in the art.

Elongation is the extension of a uniform section of a material, expressed as percent of the original length as follows:

$$\text{Elongation \%} = \frac{\text{Final length} - \text{Original length}}{\text{Original length}} \times 100.$$

Elongation is typically determined according to ASTM D412.

Z Tensile elongation is the elongation measured as described herein upon printing in Z direction.

Tear Resistance (TR), which is also referred to herein and in the art as "Tear Strength" describes the maximum force required to tear a material, expressed in N per mm, whereby the force acts substantially parallel to the major axis of the sample. Tear Resistance can be measured by the ASTM D 412 method. ASTM D 624 can be used to measure the resistance to the formation of a tear (tear initiation) and the resistance to the expansion of a tear (tear propagation). Typically, a sample is held between two holders and a uniform pulling force is applied until deformation occurs. Tear Resistance is then calculated by dividing the force applied by the thickness of the material. Materials with low Tear Resistance tend to have poor resistance to abrasion.

Tear Resistance under constant elongation describes the time required for a specimen to tear when subjected to constant elongation (lower than elongation at break). This value is determined, for example, in an "O-ring" test as described in the Examples section that follows and in FIGS. 6A-C.

Embodiments of the present invention relate to formulations usable in additive manufacturing of three-dimensional (3D) objects or parts (portions) thereof made of rubbery-like materials, to additive manufacturing processes utilizing same, and to objects fabricated by these processes.

Herein throughout, the term "object" describes a final product of the additive manufacturing. This term refers to the product obtained by a method as described herein, after removal of the support material, if such has been used as part of the building material. The "object" therefore essentially consists (at least 95 weight percent) of a hardened (e.g., cured) modeling material.

The term "object" as used herein throughout refers to a whole object or a part thereof.

An object according to the present embodiments is such that at least a part or a portion thereof is made of a rubbery-like material, and is also referred to herein as "an object made of a rubbery-like material". The object may be such that several parts or portions thereof are made of a rubbery-like material, or such that is entirely made of a rubbery-like material. The rubbery-like material can be the same or different in the different parts or portions, and, for each part, portion or the entire object made of a rubbery-like material, the rubbery-like material can be the same or different within the portion, part or object. When different rubbery-like materials are used, they can differ in their chemical composition and/or mechanical properties, as is further explained hereinafter.

Herein throughout, the phrases "building material formulation", "uncured building material", "uncured building material formulation", "building material" and other variations therefore, collectively describe the materials that are dispensed to sequentially form the layers, as described herein. This phrase encompasses uncured materials dispensed so as to form the object, namely, one or more uncured modeling material formulation(s), and uncured materials dispensed so as to form the support, namely uncured support material formulations.

Herein throughout, the phrase "cured modeling material" or "hardened modeling material" describes the part of the building material that forms the object, as defined herein, upon exposing the dispensed building material to curing, and, optionally, if a support material has been dispensed, also upon removal of the cured support material, as described herein. The cured modeling material can be a single cured material or a mixture of two or more cured materials, depending on the modeling material formulations used in the method, as described herein.

The phrase "cured modeling material" or "cured modeling material formulation" can be regarded as a cured building material wherein the building material consists only of a modeling material formulation (and not of a support material formulation). That is, this phrase refers to the portion of the building material, which is used to provide the final object.

Herein throughout, the phrase "modeling material formulation", which is also referred to herein interchangeably as "modeling formulation", "model formulation" "model material formulation" or simply as "formulation", describes a part or all of the building material which is dispensed so as to form the object, as described herein. The modeling material formulation is an uncured modeling formulation (unless specifically indicated otherwise), which, upon exposure to curing energy, forms the object or a part thereof.

In some embodiments of the present invention, a modeling material formulation is formulated for use in three-dimensional inkjet printing and is able to form a three-dimensional object on its own, i.e., without having to be mixed or combined with any other substance.

An uncured building material can comprise one or more modeling formulations, and can be dispensed such that different parts of the object are made, upon curing, of different cured modeling formulations or different combinations thereof, and hence are made of different cured modeling materials or different mixtures of cured modeling materials.

The formulations forming the building material (modeling material formulations and support material formulations) comprise one or more curable materials, which, when exposed to curing energy, form hardened (cured) material.

Herein throughout, a "curable material" is a compound (typically a monomeric or oligomeric compound, yet optionally a polymeric material) which, when exposed to curing energy, as described herein, solidifies or hardens to form a cured material. Curable materials are typically polymerizable materials, which undergo polymerization and/or cross-linking when exposed to suitable energy source.

A curable material, according to the present embodiments, also encompasses materials which harden or solidify (cure) without being exposed to a curing energy, but rather to a curing condition (for example, upon exposure to a chemical reagent), or simply upon exposure to the environment.

The terms "curable" and "solidifyable" as used herein are interchangeable.

The polymerization can be, for example, free-radical polymerization, cationic polymerization or anionic polymerization, and each can be induced when exposed to curing energy such as, for example, radiation, heat, etc., as described herein.

In some of any of the embodiments described herein, a curable material is a photopolymerizable material, which polymerizes and/or undergoes cross-linking upon exposure to radiation, as described herein, and in some embodiments the curable material is a UV-curable material, which polymerizes and/or undergoes cross-linking upon exposure to UV radiation, as described herein.

In some embodiments, a curable material as described herein is a photopolymerizable material that polymerizes via photo-induced free-radical polymerization. Alternatively, the curable material is a photopolymerizable material that polymerizes via photo-induced cationic polymerization.

In some of any of the embodiments described herein, a curable material can be a monomer, an oligomer or a short-chain polymer, each being polymerizable and/or cross-linkable as described herein.

In some of any of the embodiments described herein, when a curable material is exposed to curing energy (e.g., radiation), it hardens (cured) by any one, or combination, of chain elongation and cross-linking.

In some of any of the embodiments described herein, a curable material is a monomer or a mixture of monomers which can form a polymeric material upon a polymerization reaction, when exposed to curing energy at which the polymerization reaction occurs. Such curable materials are also referred to herein as monomeric curable materials.

In some of any of the embodiments described herein, a curable material is an oligomer or a mixture of oligomers which can form a polymeric material upon a polymerization reaction, when exposed to curing energy at which the polymerization reaction occurs. Such curable materials are also referred to herein as oligomeric curable materials.

In some of any of the embodiments described herein, a curable material, whether monomeric or oligomeric, can be a mono-functional curable material or a multi-functional curable material.

Herein, a mono-functional curable material comprises one functional group that can undergo polymerization when exposed to curing energy (e.g., radiation).

A multi-functional curable material comprises two or more, e.g., 2, 3, 4 or more, functional groups that can undergo polymerization when exposed to curing energy. Multi-functional curable materials can be, for example, di-functional, tri-functional or tetra-functional curable materials, which comprise 2, 3 or 4 groups that can undergo polymerization, respectively. The two or more functional groups in a multi-functional curable material are typically linked to one another by a linking moiety, as defined herein. When the linking moiety is an oligomeric or polymeric moiety, the multi-functional group is an oligomeric or polymeric multi-functional curable material. Multi-functional curable materials can undergo polymerization when subjected to curing energy and/or act as cross-linkers.

The method of the present embodiments manufactures three-dimensional objects in a layerwise manner by forming a plurality of layers in a configured pattern corresponding to the shape of the objects, as described herein.

The final three-dimensional object is made of the modeling material or a combination of modeling materials or a combination of modeling material/s and support material/s or modification thereof (e.g., following curing). All these operations are well-known to those skilled in the art of solid freeform fabrication.

According to an aspect of some embodiments of the present invention there is provided a method of additive manufacturing of a three-dimensional object made of an elastomeric (rubbery-like) material, as described herein.

The method is generally effected by sequentially forming a plurality of layers in a configured pattern corresponding to the shape of the object, such that formation of each of at least a few of said layers, or of each of said layers, comprises dispensing a building material (uncured) which comprises one or more modeling material formulation(s), and exposing the dispensed modeling material to curing energy to thereby form a cured modeling material, as described in further detail hereinafter.

According to embodiments of the present invention, the one or more modeling material formulation(s) comprise an elastomeric curable material and silica particles. The elastomeric curable material and the silica particles can be in the same modeling material formulation, or, when two or more modeling material formulations are used, in different modeling material formulations.

In some exemplary embodiments of the invention an object is manufactured by dispensing a building material (uncured) that comprises two or more different modeling material formulations, each modeling material formulation from a different dispensing head of the inkjet printing apparatus. The modeling material formulations are optionally and preferably deposited in layers during the same pass of the printing heads. The modeling material formulations and/or combination of formulations within the layer are selected according to the desired properties of the object, and as further described in detail hereinbelow.

The phrase "digital materials", as used herein and in the art, describes a combination of two or more materials on a microscopic scale or voxel level such that the printed zones of a specific material are at the level of few voxels, or at a level of a voxel block. Such digital materials may exhibit new properties that are affected by the selection of types of materials and/or the ratio and relative spatial distribution of two or more materials.

In exemplary digital materials, the modeling material of each voxel or voxel block, obtained upon curing, is independent of the modeling material of a neighboring voxel or voxel block, obtained upon curing, such that each voxel or voxel block may result in a different model material and the new properties of the whole part are a result of a spatial combination, on the voxel level, of several different model materials.

Herein throughout, whenever the expression "at the voxel level" is used in the context of a different material and/or properties, it is meant to include differences between voxel blocks, as well as differences between voxels or groups of few voxels. In preferred embodiments, the properties of the whole part are a result of a spatial combination, on the voxel block level, of several different model materials.

The Modeling Material Formulation and Formulation System:

Elastomeric Curable Material:

One or more of the modeling material formulations usable in the method as described herein comprises an elastomeric curable material.

The phrase "elastomeric curable material" describes a curable material, as defined herein, which, upon exposure to curing energy, provides a cured material featuring properties of an elastomer (a rubber, or rubber-like material).

Elastomeric curable materials typically comprise one or more polymerizable (curable) groups, which undergo polymerization upon exposure to a suitable curing energy, linked to a moiety that confers elasticity to the polymerized and/or cross-linked material. Such moieties typically comprise alkyl, alkylene chains, hydrocarbon, alkylene glycol groups or chains (e.g., oligo or poly(alkylene glycol) as defined herein, urethane, oligourethane or polyurethane moieties, as defined herein, and the like, including any combination of the foregoing, and are also referred to herein as "elastomeric moieties".

An elastomeric mono-functional curable material according to some embodiments of the present invention can be a vinyl-containing compound represented by Formula I:

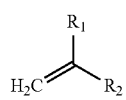

Formula I wherein at least one of $R_1$ and $R_2$ is and/or comprises an elastomeric moiety, as described herein.

The ($=CH_2$) group in Formula I represents a polymerizable group, and is, according to some embodiments, a UV-curable group, such that the elastomeric curable material is a UV-curable material.

For example, $R_1$ is or comprises an elastomeric moiety as defined herein and $R_2$ is, for example, hydrogen, C(1-4) alkyl, C(1-4) alkoxy, or any other substituent, as long as it does not interfere with the elastomeric properties of the cured material.

In some embodiments, $R_1$ is a carboxylate, and the compound is a mono-functional acrylate monomer. In some of these embodiments, $R_2$ is methyl, and the compound is mono-functional methacrylate monomer. Curable materials in which $R_1$ is carboxylate and $R_2$ is hydrogen or methyl are collectively referred to herein as "(meth)acrylates".

In some of any of these embodiments, the carboxylate group, —C(=O)—ORa, comprises Ra which is an elastomeric moiety as described herein.

In some embodiments, $R_1$ is amide, and the compound is a mono-functional acrylamide monomer. In some of these embodiments, $R_2$ is methyl, and the compound is mono-functional methacrylamide monomer. Curable materials in which $R_1$ is amide and $R_2$ is hydrogen or methyl are collectively referred to herein as "(meth)acrylamide".

(Meth)acrylates and (meth)acrylamides are collectively referred to herein as (meth)acrylic materials.

In some embodiments, $R_1$ is a cyclic amide, and in some embodiments, it is a cyclic amide such as lactam, and the compound is a vinyl lactam. In some embodiments, $R_1$ is a cyclic carboxylate such as lactone, and the compound is a vinyl lactone.

When one or both of $R_1$ and $R_2$ comprise a polymeric or oligomeric moiety, the mono-functional curable compound of Formula I is an exemplary polymeric or oligomeric mono-functional curable material. Otherwise, it is an exemplary monomeric mono-functional curable material.

In multi-functional elastomeric materials, the two or more polymerizable groups are linked to one another via an elastomeric moiety, as described herein.

In some embodiments, a multifunctional elastomeric material can be represented by Formula I as described herein, in which $R_1$ comprises an elastomeric material that terminates by a polymerizable group, as described herein.

For example, a di-functional elastomeric curable material can be represented by Formula I*:

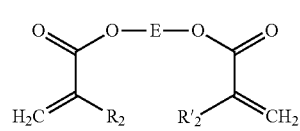

Formula I* wherein E is an elastomeric linking moiety as described herein, and $R'_2$ is as defined herein for $R_2$.

In another example, a tri-functional elastomeric curable material can be represented by Formula II:

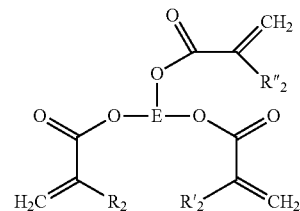

Formula II wherein E is an elastomeric linking moiety as described herein, and $R'_2$ and $R''_2$ are each independently as defined herein for $R_2$.

In some embodiments, a multi-functional (e.g., di-functional, tri-functional or higher) elastomeric curable material can be collectively represented by Formula III:

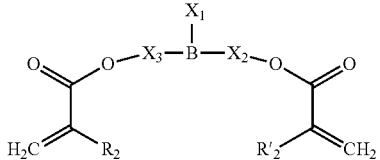

Formula III

Wherein:

$R_2$ and $R'_2$ are as defined herein;

B is a di-functional or tri-functional branching unit as defined herein (depending on the nature of $X_1$);

$X_2$ and $X_3$ are each independently absent, an elastomeric moiety as described herein, or is selected from an alkyl, a hydrocarbon, an alkylene chain, a cycloalkyl, an aryl, an alkylene glycol, a urethane moiety, and any combination thereof; and $X_1$ is absent or is selected from an alkyl, a hydrocarbon, an alkylene chain, a cycloalkyl, an aryl, an alkylene glycol, a urethane moiety, and an elastomeric moiety, each being optionally being substituted (e.g., terminated) by a meth (acrylate) moiety (O—C(=O) CR"$_2$=CH$_2$), and any combination thereof, or, alternatively, X$_1$ is:

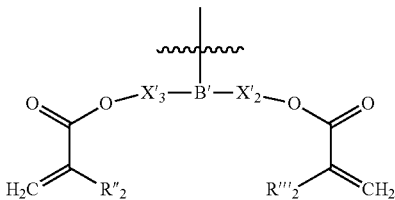

wherein:
the curved line represents the attachment point;
B' is a branching unit, being the same as, or different from, B;
X'$_2$ and X'$_3$ are each independently as defined herein for X$_2$ and X$_3$; and
R"$_2$ and R'"$_2$ are as defined herein for R$_2$ and R'$_2$.
provided that at least one of X$_1$, X$_2$ and X$_3$ is or comprises an elastomeric moiety as described herein.

The term "branching unit" as used herein describes a multi-radical, preferably aliphatic or alicyclic group. By "multi-radical" it is meant that the linking moiety has two or more attachment points such that it links between two or more atoms and/or groups or moieties.

That is, the branching unit is a chemical moiety that, when attached to a single position, group or atom of a substance, creates two or more functional groups that are linked to this single position, group or atom, and thus "branches" a single functionality into two or more functionalities.

In some embodiments, the branching unit is derived from a chemical moiety that has two, three or more functional groups. In some embodiments, the branching unit is a branched alkyl or a branched linking moiety as described herein.

Multi-functional elastomeric curable materials featuring 4 or more polymerizable groups are also contemplated, and can feature structures similar to those presented in Formula III, while including, for example, a branching unit B with higher branching, or including an X$_1$ moiety featuring two (meth)acrylate moieties as defined herein, or similar to those presented in Formula II, while including, for example, another (meth)acrylate moiety that is attached to the elastomeric moiety.

In some embodiments, the elastomeric moiety, e.g., Ra in Formula I or the moiety denoted as E in Formulae I*, II and III, is or comprises an alkyl, which can be linear or branched, and which is preferably of 3 or more or of 4 or more carbon atoms; an alkylene chain, preferably of 3 or more or of 4 or more carbon atoms in length; an alkylene glycol as defined herein, an oligo(alkylene glycol), or a poly(alkylene glycol), as defined herein, preferably of 4 or more atoms in length, a urethane, an oligourethane, or a polyurethane, as defined herein, preferably of 4 or more carbon atoms in length, and any combination of the foregoing.

In some of any of the embodiments described herein, the elastomeric curable material is a (meth)acrylic curable material, as described herein, and in some embodiments, it is an acrylate.

In some of any of the embodiments described herein, the elastomeric curable material is or comprises a mono-functional elastomeric curable material, and is some embodiments, the mono-functional elastomeric curable material is represented by Formula I, wherein R$_1$ is —C(=O)—ORa and Ra is an alkylene chain (e.g., of 4 or more, preferably 6 or more, preferably 8 or more, carbon atoms in length), or a poly(alkylene glycol) chain, as defined herein.

In some embodiments, the elastomeric curable material is or comprises a multi-functional elastomeric curable material, and is some embodiments, the multi-functional elastomeric curable material is represented by Formula I*, wherein E is an alkylene chain (e.g., of 4 or more, or 6 or more, carbon atoms in length), and/or a poly(alkylene glycol) chain, as defined herein.

In some embodiments, the elastomeric curable material is or comprises a multi-functional elastomeric curable material, and is some embodiments, the multi-functional elastomeric curable material is represented by Formula II, wherein E is a branched alkyl (e.g., of 3 or more, or of 4 or more, or of 5 or more, carbon atoms in length).

In some of any of the embodiments described herein, the elastomeric curable material is an elastomeric acrylate or methacrylate (also referred to as acrylic or methacrylic elastomer), for example, of Formula I, I*, II or III, and in some embodiments, the acrylate or methacrylate is selected such that when hardened, the polymeric material features a Tg lower than 0° C. or lower than −10° C.

Exemplary elastomeric acrylate and methacrylate curable materials include, but are not limited to, 2-propenoic acid, 2-[[(butylamino)carbonyl]oxy]ethyl ester (an exemplary urethane acrylate), and compounds marketed under the trade names SR335 (Lauryl acrylate) and SR395 (isodecyl acrylate) (by Sartomer). Other examples include compounds marketed under the trade names SR350D (a trifunctional trimethylolpropane trimethacrylate (TMPTMA), SR256 (2-(2-ethoxyethoxy)ethyl acrylate, SR252 (polyethylene glycol (600) dimethacrylate), SR561 (an alkoxylated hexane diol diacrylate) (by Sartomer).

It is to be notes that other acrylic materials, featuring, for example, one or more acrylamide groups instead of one or more acrylate or methacrylate groups are also contemplated.

In some of any of the embodiments described herein, the one or more elastomeric curable materials are included in the one or more modeling material formulations, as described in further detail hereinunder.

In some of any of the embodiment described herein, the elastomeric curable material comprises one or more mono-functional elastomeric curable material(s) (e.g., a mono-functional elastomeric acrylate, as represented, for example, in Formula I) and one or more multi-functional (e.g., di-functional) elastomeric curable materials(s) (e.g., a di-functional elastomeric acrylate, as represented, for example, in Formula I*, II or III) and in any of the respective embodiments as described herein.

In some of any of the embodiments described herein, a total amount of the elastomeric curable material(s) is at least 40%, or at last 50%, or at least 60%, and can be up to 70% or even 80%, of the total weight of a modeling material formulation(s) or a formulation system comprising same.

In some embodiments, the one or more modeling material formulation(s) comprise one modeling material formulation. In some embodiments, the one or more modeling material formulation(s) comprise two or more formulations, and the one or more elastomeric curable material(s) are comprised within 1, 2 or all the formulations.

Hereinthroughout, the one or more modeling material formulation(s) are also referred to herein as a formulation system, as described in further detail hereinafter.

Silica Particles:
Each of the one or more modeling formulations comprises at least one curable material, and at least one of the modeling formulations comprises silica particles.

In some of any of the embodiments described herein, the silica particles have an average particle size lower than 1 micron, namely, the silica particles are sub-micron particles. In some embodiments, the silica particles are nano-sized particles, or nanoparticles, having an average particle size in the range of from 0.1 nm to 900 nm, or from 0.1 nm to 700 nm, or from 1 nm to 700 nm, or from 1 nm to 500 nm or from 1 nm to 200 nm, including any intermediate value and subranges therebetween.

In some embodiments, at least a portion of such particles may aggregate, upon being introduced to the formulation. In some of these embodiments, the aggregate has an average size of no more than 3 microns, or no more than 1.5 micron.

Any commercially available formulations of sub-micron silica particles is usable in the context of the present embodiments, including fumed silica, colloidal silica, precipitated silica, layered silica (e.g., montmorillonite), and aerosol assisted self-assembly of silica particles.

The silica particles can be such that feature a hydrophobic or hydrophilic surface. The hydrophobic or hydrophilic nature of the particles' surface is determined by the nature of the surface groups on the particles.

When the silica is untreated, namely, is composed substantially of Si and O atoms, the particles typically feature silanol (Si—OH) surface groups and are therefore hydrophilic. Untreated (or uncoated) colloidal silica, fumed silica, precipitated silica and layered silica all feature a hydrophilic surface, and are considered hydrophilic silica.

Layered silica may be treated so as to feature long-chain hydrocarbons terminating by quaternary ammonium and/or ammonium as surface groups, and the nature of its surface is determined by the length of the hydrocarbon chains.

Hydrophobic silica is a form of silica in which hydrophobic groups are bonded to the particles' surface, and is also referred to as treated silica or functionalized silica (silica reacted with hydrophobic groups).

Silica particles featuring hydrophobic surface groups such as, but not limited to, alkyls, preferably medium to high alkyls of 2 or more carbon atoms in length, preferably of 4 or more, or 6 or more, carbon atoms in length, cycloalkyls, aryl, and other hydrocarbons, as defined herein, or hydrophobic polymers (e.g., polydimethylsiloxane), are particles of hydrophobic silica.

Silica particles as described herein can therefore by untreated (non-functionalized) and as such are hydrophilic particles.

Alternatively, silica particles as described herein can be treated, or functionalized, by being reacted so as to form bonds with the moieties on their surface.

When the moieties are hydrophilic moieties, the functionalized silica particles are hydrophilic.

Silica particles featuring hydrophilic surface groups such as, but not limited to, hydroxy, amine, ammonium, carboxy, silanol, oxo, and the like, are particles of hydrophilic silica.

When the moieties are hydrophobic moieties, as described herein, the functionalized silica particles are hydrophobic.

In some of any of the embodiments described herein, at least a portion, or all, of the silica particles feature a hydrophilic surface (namely, are hydrophilic silica particles, for example, of untreated silica such as colloidal silica).

In some of any of the embodiments described herein, at least a portion, or all, of the silica particles feature a hydrophobic surface (namely, are hydrophobic silica particles).

In some embodiments, the hydrophobic silica particles are functionalized silica particles, namely, particles of silica treated with one or more hydrophobic moieties.

In some of any of the embodiments described herein, at least a portion, or all, of the silica particles are hydrophobic silica particles, functionalized by curable functional groups (particles featuring curable groups on their surface).

The curable functional groups can be any polymerizable group as described herein. In some embodiments, the curable functional groups are polymerizable by the same polymerization reaction as the curable monomers in the formulation, and/or when exposed to the same curing condition as the curable monomers. In some embodiments, the curable groups are (meth)acrylic (acrylic or methacrylic) groups, as defined herein.

Hydrophilic and hydrophobic, functionalized and untreated silica particles as described herein can be commercially available materials or can be prepared using methods well known in the art.

By "at least a portion", as used in the context of these embodiments, it is meant at least 10%, or at least 20%, or at least 30%, or at least 40%, or at least 50%, or at least 60%, or at least 70%, or at least 80%, or at least 90%, or at least 95%, or at least 98%, of the particles.

The silica particles may also be a mixture of two or more types of silica particles, for example, two or more types of any of the silica particles described herein.

In some of any of the embodiments described herein, an amount of the silica particles in a modeling material formulation comprising same ranges from about 1% to about 20%, or from about 1% to about 15%, or from about 1% to about 10%, by weight, of the total weight of the modeling material formulation.

In some of any of the embodiments described herein, an amount of the silica particles in a formulation system as described herein ranges from about 1% to about 20%, or from about 1% to about 15%, or from about 1% to about 10%, by weight, of the total weight of the formulation system.

In some embodiments, the formulation system comprises one formulation. In some embodiments, the formulation system comprises two or more formulations, and the silica particles are comprised within 1, 2 or all the formulations.

The amount of the silica particles can be manipulated as desired so as to control the mechanical properties of the cured modeling material and/or the object or part therein comprising same. For example, higher amount of silica particles may result in higher elastic modulus of the cured modeling material and/or the object or part thereof comprising same.

In some of any of the embodiments described herein, an amount of the silica particles is such that a weight ratio of the elastomeric curable material(s) and the silica particles in the one or more modeling material formulation(s) ranges from about 50:1 to about 4:1 or from about 30:1 to about 4:1 or from about 20:1 to about 2:1, including any intermediate values and subranges therebetween.

Additional Components:

According to some of any of the embodiments described herein, one or more of the modeling material formulation(s) further comprises one or more additional curable material(s).

The additional curable material can be a mono-functional curable material, a multi-functional curable material, or a mixture thereof, and each material can be a monomer, an oligomer or a polymer, or a combination thereof.

Preferably, but not obligatory, the additional curable material is polymerizable when exposed to the same curing energy at which the curable elastomeric material is polymerizable, for example, upon exposure to irradiation (e.g., UV-vis irradiation).

In some embodiments, the additional curable material is such that when hardened, the polymerized material features Tg higher than that of an elastomeric material, for example, a Tg higher than 0° C., or higher than 5° C. or higher than 10° C.

Herein throughout, "Tg" refers to glass transition temperature defined as the location of the local maximum of the E" curve, where E" is the loss modulus of the material as a function of the temperature.

Broadly speaking, as the temperature is raised within a range of temperatures containing the Tg temperature, the state of a material, particularly a polymeric material, gradually changes from a glassy state into a rubbery state.

Herein, "Tg range" is a temperature range at which the E" value is at least half its value (e.g., can be up to its value) at the Tg temperature as defined above.

Without wishing to be bound to any particular theory, it is assumed that the state of a polymeric material gradually changes from the glassy state into the rubbery within the Tg range as defined above. Herein, the term "Tg" refers to any temperature within the Tg range as defined herein.

In some embodiments, the additional curable material is a non-elastomeric curable material, featuring, for example, when hardened, Tg and/or Elastic Modulus that are different from those representing elastomeric materials.

In some embodiments, the additional curable material is a mono-functional acrylate or methacrylate ((meth)acrylate). Non-limiting examples include isobornyl acrylate (IBOA), isobornylmethacrylate, acryloyl morpholine (ACMO), phenoxyethyl acrylate, marketed by Sartomer Company (USA) under the trade name SR-339, urethane acrylate oligomer such as marketed under the name CN 131B, and any other acrylates and methacrylates usable in AM methodologies.

In some embodiments, the additional curable material is a multi-functional acrylate or methacrylate ((meth)acrylate). Non-limiting examples of multi-functional (meth)acrylates include propoxylated (2) neopentyl glycol diacrylate, marketed by Sartomer Company (USA) under the trade name SR-9003, Ditrimethylolpropane Tetra-acrylate (DiTMPTTA), Pentaerythitol Tetra-acrylate (TETTA), and Dipentaerythitol Penta-acrylate (DiPEP), and an aliphatic urethane diacrylate, for example, such as marketed as Ebecryl 230. Non-limiting examples of multi-functional (meth) acrylate oligomers include ethoxylated or methoxylated polyethylene glycol diacrylate or dimethacrylate, ethoxylated bisphenol A diacrylate, polyethylene glycol-polyethylene glycol urethane diacrylate, a partially acrylated polyol oligomer, polyester-based urethane diacrylates such as marketed as CNN91.

Any other curable materials, preferably curable materials featuring a Tg as defined herein, are contemplated as an additional curable material.

In some of any of the embodiments described herein, one or more of the modeling material formulation(s) further comprises an initiator, for initiating polymerization of the curable materials.

When all curable materials (elastomeric and additional, if present) are photopolymerizable, a photoinitiator is usable in these embodiments.

Non-limiting examples of suitable photoinitiators include benzophenones (aromatic ketones) such as benzophenone, methyl benzophenone, Michler's ketone and xanthones; acylphosphine oxide type photo-initiators such as 2,4,6-trimethylbenzolydiphenyl phosphine oxide (TMPO), 2,4,6-trimethylbenzoylethoxyphenyl phosphine oxide (TEPO), and bisacylphosphine oxides (BAPO's); benzoins and bezoin alkyl ethers such as benzoin, benzoin methyl ether and benzoin isopropyl ether and the like. Examples of photoinitiators are alpha-amino ketone, bisacylphosphine oxide (BAPO's), and those marketed under the tradename Irgacure®.

A photo-initiator may be used alone or in combination with a co-initiator. Benzophenone is an example of a photoinitiator that requires a second molecule, such as an amine, to produce a free radical. After absorbing radiation, benzophenone reacts with a ternary amine by hydrogen abstraction, to generate an alpha-amino radical which initiates polymerization of acrylates. Non-limiting example of a class of co-initiators are alkanolamines such as triethylamine, methyldiethanolamine and triethanolamine.

A concentration of a photoinitiator in a formulation containing same may range from about 0.1 to about 5 weight percent, or from about 1 to about 5 weight percent, including any intermediate value and subranges therebetween.

According to some of any of the embodiments described herein, one or more of the modeling material formulation(s) further comprises one or more additional, non-curable material, for example, one or more of a colorant, a dispersant, a surfactant, a stabilizer and an inhibitor.

An inhibitor is included in the formulation(s) for preventing or slowing down polymerization and/or curing prior to exposing to the curing condition. Commonly used inhibitors, such as radical inhibitors, are contemplated.

Commonly used surfactants, dispersants, colorants and stabilizers are contemplated. Exemplary concentrations of each component, if present, range from about 0.01 to about 1, or from about 0.01 to about 0.5, or from about 0.01 to about 0.1, weight percent, of the total weight of the formulation containing same.

Exemplary Formulations:

In some of any of the embodiments described herein, the elastomeric curable material is a UV curable material, and in some embodiments, it is an elastomeric (meth)acrylate, for example, an elastomeric acrylate.

In some of any of the embodiments described herein, an additional curable material component is included in the modeling material formulation, and in some embodiments, this component is a UV-curable acrylate or methacrylate.

In some of any of the embodiments described herein, the silica particles are (meth)acrylate-functionalized silica particles.

In some of any of the embodiments described herein, the one or more modeling material formulation(s) comprise(s) one or more mono-functional elastomeric acrylate, one or more multi-functional elastomeric acrylate, one or more mono-functional acrylate or methacrylate and one or more multi-functional acrylate or methacrylate.

In some of these embodiments, the one or more modeling material formulations further comprise one or more photoinitiators, for example, of the Igracure® family.

In some of any of the embodiments described herein, all curable materials and the silica particles are included in a single modeling material formulation. In these embodiments, the modeling material formulation forms a formulation system consisting of one modeling material formulation.

In some of any of the embodiments described herein, the (uncured) building material comprises two or more modeling material formulations. In these embodiments, the modeling material formulation forms a formulation system that comprises two or more modeling material formulations.

In some of these embodiments, one modeling material formulation (e.g., a first formulation, or Part A) comprises an elastomeric curable material (e.g., an elastomeric acrylate) and another modeling material formulation (e.g., a second formulation, or Part B) comprises an additional curable material.

Alternatively, each of the two modeling material formulations comprises an elastomeric curable material and one of the formulations further comprises an additional curable material.

Further alternatively, each of the two modeling material formulations comprises an elastomeric curable material, yet, the elastomeric materials are different in each formulation. For example, one formulation comprises a mono-functional elastomeric curable material and another formulation comprises a multi-functional elastomeric material. Alternatively, one formulation comprises a mixture of mono-functional and multi-functional elastomeric curable materials at a ratio W and another formulation comprises a mixture of mono-functional and multi-functional elastomeric curable materials at a ratio Q, wherein W and Q are different.

Whenever each of the modeling material formulations comprises an elastomeric material as described herein, one or more of the modeling material formulations can further comprise an additional curable material. In exemplary embodiments, one of the formulations comprises a mono-functional additional material and another comprises a multi-functional additional material. In further exemplary embodiments, one of the formulations comprises an oligomeric curable material and another formulation comprises a monomeric curable material.

Any combination of elastomeric and additional curable materials as described herein is contemplated for inclusion in the two or more modeling material formulations. Selecting the composition of the modeling material formulations and the printing mode allows fabrication of objects featuring a variety of properties in a controllable manner, as is described in further detail hereinbelow.

In some embodiments, the one or more modeling material formulations are selected such that a ratio of an elastomeric curable material and an additional curable material provides a rubbery-like material featuring a certain Shore A hardness.

In some embodiments, a series of modeling material formulations or of modeling material formulation systems (e.g., of two or more modeling material formulations) provides for a series of rubbery-like materials featuring a series of Shore A hardness values.

In some embodiments, silica particles, one or more photoinitiators, and optionally other components, are included in one or both modeling material formulations.

In exemplary modeling material formulations according to some of any of the embodiments described herein, all curable materials are (meth)acrylates.

In any of the exemplary modeling material formulations described herein, a concentration of a photoinitiator ranges from about 1% to about 5% by weight, or from about 2% to about 5%, or from about 3% to about 5%, or from about 3% to about 4% (e.g., 3, 3.1, 3.2, 3.25, 3.3, 3.4, 3.5, 3.6, 3.7, 3.8, 3.85, 3.9, including any intermediate value therebetween) %, by weight, of the total weight of the formulation or formulation system comprising same.

In any of the exemplary modeling material formulations described herein, a concentration of an inhibitor ranges from 0 to about 2% weight, or from 0 to about 1%, and is, for example, 0, 0.1, 0.2, 0.3, 0.4, 0.5, 0.6, 0.7, 0.8, 0.9 or about 1%, by weight, including any intermediate value therebetween, of the total weight of the formulation or a formulation system comprising same.

In any of the exemplary modeling material formulations described herein, a concentration of a surfactant ranges from 0 to about 1% weight, and is, for example, 0, 0.01, 0.05, 0.1, 0.5 or about 1%, by weight, including any intermediate value therebetween, of the total weight of the formulation or formulation system comprising same.

In any of the exemplary modeling material formulations described herein, a concentration of a dispersant ranges from 0 to about 2% weight, and is, for example, 0, 0.1, 0.5, 0.7, 1, 1.2, 1.3, 1.35, 1.4, 1.5, 1.7, 1.8 or about 2%, by weight, including any intermediate value therebetween, of the total weight of the formulation or formulation system comprising same.

In exemplary modeling material formulations according to some of any of the embodiments described herein, a total concentration of an elastomeric curable material ranges from about 30% to about 90% by weight, or from about 40% to about 90%, by weight, or from about 40% to about 85%, by weight.

By "total concentration" it is meant herein throughout a total weight in all of the (one or more) modeling material formulations, or in a formulation system as described herein.

In some embodiments, the elastomeric curable material comprises a mono-functional elastomeric curable material and a multi-functional elastomeric curable material.

In some embodiments, a total concentration of the mono-functional elastomeric curable material ranges from about 20% to about 70%, or from about 30% to about 50%, by weight, including any intermediate value and subranges therebetween. In exemplary embodiments, a total concentration of the mono-functional elastomeric curable material ranges from about 50% to about 70%, or from about 55% to about 65%, or from about 55% to about 60% (e.g. 58%), by weight, including any intermediate value and subranges therebetween. In exemplary embodiments, a total concentration of the mono-functional elastomeric curable material ranges from about 30% to about 50%, or from about 35% to about 50%, or from about 40% to about 45% (e.g., 42%), by weight, including any intermediate value and subranges therebetween.

In some embodiments, a total concentration of the multi-functional elastomeric curable material ranges from about 10% to about 30%, by weight. In exemplary embodiments, a concentration of the mono-functional elastomeric curable material ranges from about 10% to about 20%, or from about 10% to about 15% (e.g. 12%), by weight. In exemplary embodiments, a concentration of the mono-functional elastomeric curable material ranges from about 10% to about 30%, or from about 10% to about 20%, or from about 15% to about 20% (e.g., 16%), by weight.

In exemplary modeling material formulations according to some of any of the embodiments described herein, a total concentration of an additional curable material ranges from about 10% to about 40% by weight, or from about 15% to about 35%, by weight, including any intermediate value and subranges therebetween.

In some embodiments, the additional curable material comprises a mono-functional curable material.

In some embodiments, a total concentration of the mono-functional additional curable material ranges from about 15% to about 25%, or from about 20% to about 25% (e.g., 21%), by weight, including any intermediate value and subranges therebetween. In exemplary embodiments, a concentration of the mono-functional elastomeric curable material ranges from about 20% to about 30%, or from about 25% to about 30% (e.g., 28%), by weight, including any intermediate value and subranges therebetween.

In exemplary modeling material formulations or formulation systems according to some of any of the embodiments described herein, the elastomeric curable material comprises a mono-functional elastomeric curable material and a multi-functional elastomeric curable material; a total concentration of the mono-functional elastomeric curable material ranges from about 30% to about 50% (e.g., from about 40% to about 45%) or from about 50% to about 70% (e.g., from about 55% to about 60%) by weight; and a total concentration of the multi-functional elastomeric curable material ranges from about 10% to about 20% by weight; and the one or more formulation(s) further comprise(s) an additional mono-functional curable material at a total concentration that ranges from about 20% to about 30%, by weight.

According to some of any of the embodiments described herein, the one or more modeling formulation(s) comprise(s) at least one elastomeric mono-functional curable material, at least one elastomeric multi-functional curable material and at least additional mono-functional curable material.

According to some of any of the embodiments described herein, a total concentration of the curable mono-functional material ranges from 10% to 30%, by weight of the total weight of the one or more modeling formulation(s).

According to some of any of the embodiments described herein, a total concentration of the elastomeric mono-functional curable material ranges from 50% to 70%, by weight, of the total weight of the one or more modeling formulation(s).

According to some of any of the embodiments described herein, a total concentration of the elastomeric multi-functional curable material ranges from 10% to 20%, by weight, of the total weight of the one or more modeling formulation(s).

According to some of any of the embodiments described herein, a total concentration of the curable mono-functional material ranges from 10% to 30%, by weight; a total concentration of the elastomeric mono-functional curable material ranges from 50% to 70%, by weight; and a total concentration of the elastomeric multi-functional curable material ranges from 10% to 20%, by weight, of the total weight of the one or more modeling formulation(s).

According to some of any of the embodiments described herein, a total concentration of the curable mono-functional material ranges from 20% to 30%, by weight, of the total weight of the one or more modeling formulation(s).

According to some of any of the embodiments described herein, a total concentration of the elastomeric mono-functional curable material ranges from 30% to 50%, by weight, of the total weight of the one or more modeling formulation(s).

According to some of any of the embodiments described herein, a total concentration of the elastomeric multi-functional curable material ranges from 10% to 30%, by weight, of the total weight of the one or more modeling formulation(s).

According to some of any of the embodiments described herein, a total concentration of the curable mono-functional material ranges from 20% to 30%, by weight; a total concentration of the elastomeric mono-functional curable material ranges from 30% to 50%, by weight; and a total concentration of the elastomeric multi-functional curable material ranges from 10% to 30%, by weight, of the total weight of the one or more modeling formulation.

In the exemplary modeling material formulations described herein, a concentration of each component is provided as its concentration when one modeling material formulations is used or as its total concentration in two or more modeling material formulations.

In some embodiments, a modeling material formulation (or the two or more modeling material formulations) as described herein, is characterized, when hardened, by Tear Resistance of at least 4,000 N/m, or at least 4500 N/m or at least 5,000 N/m.

In some embodiments, a modeling material formulation (or the two or more modeling material formulations) as described herein, is characterized, when hardened, by Tear Resistance higher by at least 500 N/m, or by at least 700 N/m, or by at least 800 N/m, than that of the same modeling material formulation(s) devoid of said silica particles, when hardened.

In some embodiments, a modeling material formulation (or the two or more modeling material formulations) as described herein, is characterized, when hardened, by Tensile Strength of at least 2 MPa.

In some embodiments, a modeling material formulation (or the two or more modeling material formulations) as described herein, is such that an object consisting of the cured modeling material and featuring two O-rings and a tube connecting the rings, is characterized by Tear Resistance under constant elongation of at least one hour, or at least one day. In some of these embodiments, the object is as depicted in FIGS. 6A-C.

Formulation System and Kit:

In some of any of the embodiments described herein, there is provided a formulation system which comprises an elastomeric curable material(s) as described herein in any of the respective embodiments, and silica particles, as described herein in any of the respective embodiments.

The formulation system can comprise one formulation, or two or more formulations.

In some embodiments, the formulation system is usable, or is for use, in additive manufacturing as described herein in any of the respective embodiments, for example, as a modeling material formulation system.

The one or more formulations composing the formulation system of the present embodiments are each as described herein for the one or more modeling material formulations, in any of the respective embodiments as any combination thereof.

According to some of any of the embodiments described herein, an amount of the silica particles in the formulation system ranges from 1 to 20, or from 1 to 15, or from 1 to 10, weight percent, of the total weight of the formulation system.

According to some of any of the embodiments described herein, a weight ratio of a total weight of the elastomeric curable material and a total weight of the silica particles, in the formulation system, ranges from 30:1 to 4:1.

According to some of any of the embodiments described herein, an amount of the elastomeric curable material in the formulation system is at least 40%, or at least 50%, by weight, of the total weight of the formulation system.

According to some of any of the embodiments described herein, the elastomeric curable material is selected from a mono-functional elastomeric curable monomer, a mono-functional elastomeric curable oligomer, a multi-functional elastomeric curable monomer, a multi-functional elastomeric curable oligomer, and any combination thereof, as described herein for an elastomeric curable material in any of the respective embodiments and any combination thereof.

In some embodiments, the elastomeric curable material comprises one or more materials selected from the materials represented by Formula I, I*, II and III, as described herein in any of the respective embodiments and any combination thereof.

According to some of any of the embodiments described herein, the elastomeric curable material and the silica particles are in the same formulation.

According to some of any of the embodiments described herein, the formulation system further comprises at least one additional curable material.

According to some of any of the embodiments described herein, the additional curable material is selected from a mono-functional curable monomer, a mono-functional curable oligomer, a multi-functional curable monomer, a multi-functional curable oligomer and any combination thereof, as described herein for an additional curable material in any of the respective embodiments and any combination thereof.

According to some of any of the embodiments described herein, the elastomeric curable material, the silica particles and the additional curable material are in the same formulation.

According to some of any of the embodiments described herein, the formulation system consists of one formulation, and according to some embodiments, this formulation comprises an elastomeric curable material, silica particles and an additional curable material, as described herein in any of the respective embodiments.

According to some of any of the embodiments described herein, the formulation system comprises two or more formulations.

According to some of any of the embodiments described herein, the formulation system comprises two or more formulations, wherein one of the formulations comprises the elastomeric curable material and another formulation comprises the additional curable material. Optionally, the two or more formulations comprise an elastomeric curable material, silica particles, and optionally an additional curable material, which are as described herein for two or more modeling material formulations, in any of the respective embodiments and any combination thereof.

According to some of any of the embodiments described herein, the formulation system further comprises at least one additional, non-curable material.

According to some of any of the embodiments described herein, the non-curable material is selected from a colorant, an initiator, a dispersant, a surfactant, a stabilizer, an inhibitor, and any combination thereof, as described herein for the one or more modeling material formulation, in any of the respective embodiments and any combination thereof.

According to some of any of the embodiments described herein, the formulation system comprises at least one elastomeric mono-functional curable material, at least one elastomeric multi-functional curable material and at least additional mono-functional curable material.

According to some of any of the embodiments described herein, a total concentration of the curable mono-functional material ranges from 10% to 30%, by weight of the total weight of the formulation system.

According to some of any of the embodiments described herein, a total concentration of the elastomeric mono-functional curable material ranges from 50% to 70%, by weight of the total weight of the formulation system.

According to some of any of the embodiments described herein, a total concentration of the elastomeric multi-functional curable material ranges from 10% to 20%, by weight, of the total weight of the formulation system.

According to some of any of the embodiments described herein, a total concentration of the curable mono-functional material ranges from 10% to 30%, by weight; a total concentration of the elastomeric mono-functional curable material ranges from 50% to 70%, by weight; and a total concentration of the elastomeric multi-functional curable material ranges from 10% to 20%, by weight, of the total weight of the formulation system.

According to some of any of the embodiments described herein, a total concentration of the curable mono-functional material ranges from 20% to 30%, by weight, of the total weight of the formulation system.

According to some of any of the embodiments described herein, a total concentration of the elastomeric mono-functional curable material ranges from 30% to 50%, by weight, of the total weight of the formulation system.

According to some of any of the embodiments described herein, a total concentration of the elastomeric multi-functional curable material ranges from 10% to 30%, by weight, of the total weight of the formulation system.

According to some of any of the embodiments described herein, a total concentration of the curable mono-functional material ranges from 20% to 30%, by weight; a total concentration of the elastomeric mono-functional curable material ranges from 30% to 50%, by weight; and a total concentration of the elastomeric multi-functional curable material ranges from 10% to 30%, by weight, of the total weight of the formulation system.

According to some of any of the embodiments described herein, the elastomeric curable material is a UV-curable elastomeric material.

According to some of any of the embodiments described herein, the elastomeric curable material is an acrylic elastomer.

In some embodiments, the formulation system is characterized, when hardened, by properties as described herein for the one or more modeling material formulations in any of the respective embodiments as any combination thereof.

In some of any of the embodiments described herein there is provided a kit comprising the modeling material formulation(s) or the formulation system, as described herein in any of the respective embodiments and any combination thereof.

In some embodiments, when the kit comprises two or more modeling material formulations, or a formulation system comprising two or more formulations, each formulation is packaged individually in the kit.

In exemplary embodiments, the formulation(s) are packaged within the kit in a suitable packaging material, preferably, an impermeable material (e.g., water- and gas-impermeable material), and further preferably an opaque material. In some embodiments, the kit further comprises instructions to use the formulations in an additive manufacturing process, preferably a 3D inkjet printing process as described herein. The kit may further comprise instructions to use the formulations in the process in accordance with the method as described herein.

In some embodiments, the kit comprises a series of formulation systems, as described herein in any of the respective embodiments, wherein each formulation system provides, when hardened, an elastomeric material that features a certain property, such that the series of formulation systems provides a series of elastomeric materials featuring a range of values of this property (for example, a series of formulation systems that provide a series of Shore A Hardness or a series of Tensile Strength, or a series of Tear Resistance). As described hereinabove, the formulation systems in the series can differ from one another by the amount and/or type of silica particles. In some embodiments, each formulation system is packaged individually within the kit.

Figure 1A:
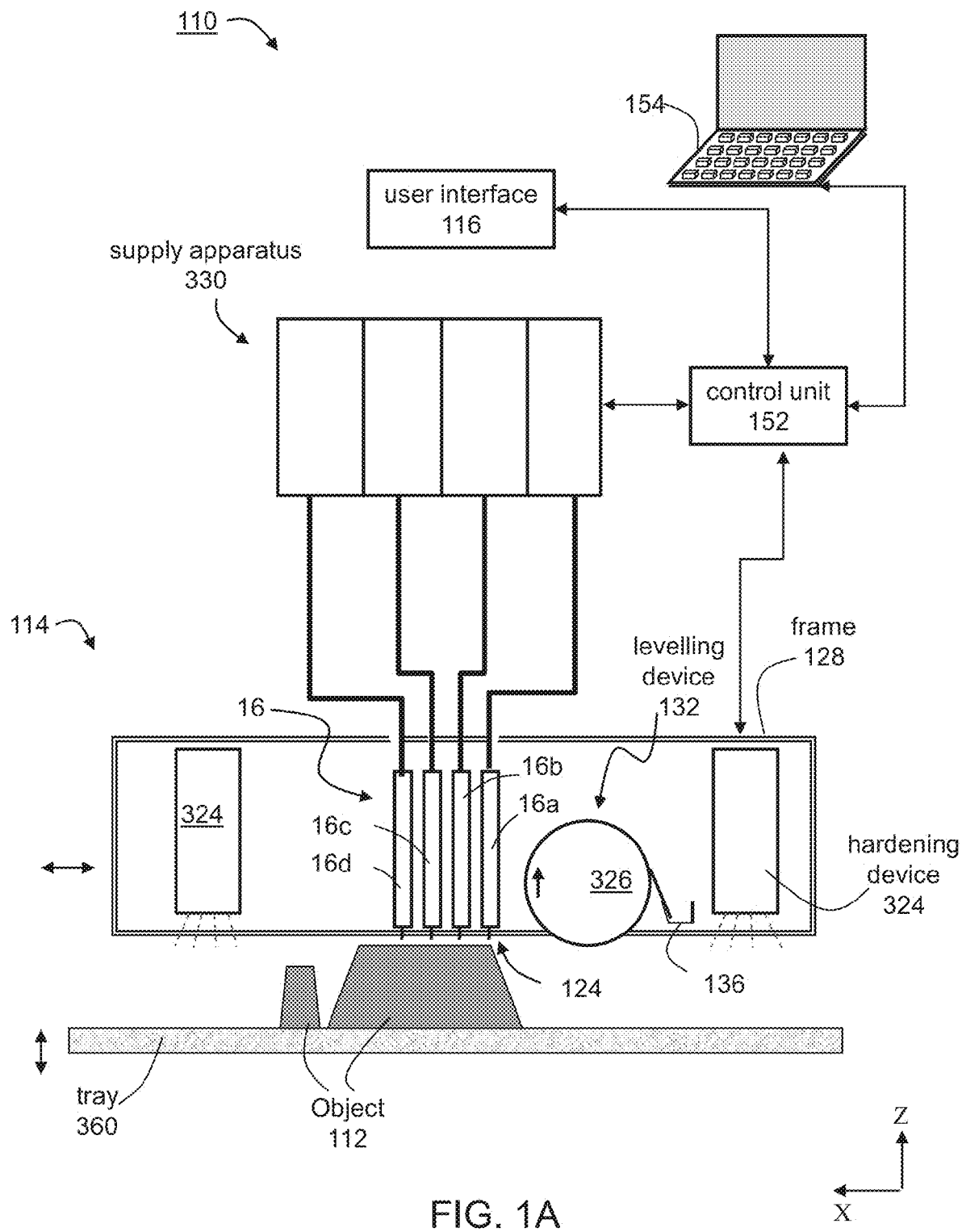
Figure 2A:
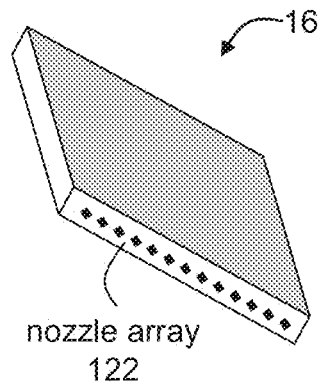
Figure 2B:
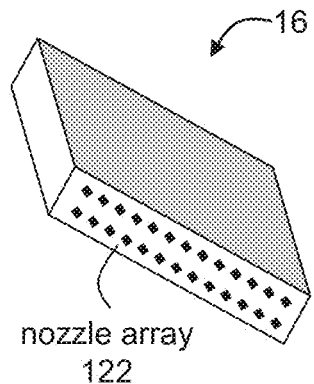
Figure 2C:
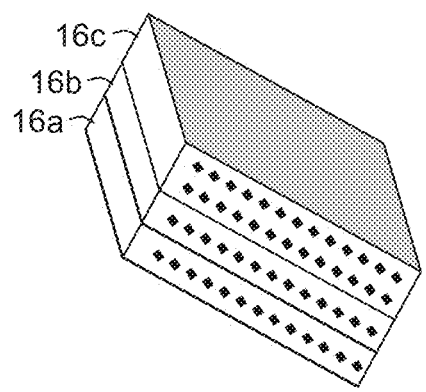

The System:

A representative and non-limiting example of a system 110 suitable for AM of an object 112 according to some embodiments of the present invention is illustrated in FIG. 1A. System 110 comprises an additive manufacturing apparatus 114 having a dispensing unit 16 which comprises a plurality of dispensing heads. Each head preferably comprises an array of one or more nozzles 122, as illustrated in FIGS. 2A-C described below, through which a liquid building material 124 is dispensed.

Preferably, but not obligatorily, apparatus 114 is a three-dimensional inkjet printing apparatus, in which case the dispensing heads are inkjet printing heads, and the (uncured) building material is dispensed via inkjet technology. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, fused deposition modeling apparatus and fused material deposition apparatus.

Each dispensing head is optionally and preferably fed via a building material reservoir which may optionally include a temperature control unit (e.g., a temperature sensor and/or a heating device), and a material level sensor. To dispense the building material, a voltage signal is applied to the dispensing heads to selectively deposit droplets of material via the dispensing head nozzles, for example, as in piezoelectric inkjet printing technology. The dispensing rate of each head depends on the number of nozzles, the type of nozzles and the applied voltage signal rate (frequency). Such dispensing heads are known to those skilled in the art of solid freeform fabrication.

Preferably, but not obligatorily, the overall number of dispensing nozzles or nozzle arrays is selected such that half of the dispensing nozzles are designated to dispense support material formulation and half of the dispensing nozzles are designated to dispense modeling material formulation(s), i.e. the number of nozzles jetting modeling material formulation(s) is the same as the number of nozzles jetting support material formulation(s). In the representative example of FIG. 1A, four dispensing heads 16a, 16b, 16c and 16d are illustrated. Each of heads 16a, 16b, 16c and 16d has a nozzle array. In this Example, heads 16a and 16b can be designated for modeling material formulation(s) and heads 16c and 16d can be designated for support material formulation(s). Thus, head 16a can dispense a first modeling material formulation, head 16b can dispense a second modeling material formulation and heads 16c and 16d can both dispense a support material formulation. In an alternative embodiment, heads 16c and 16d, for example, may be combined in a single head having two nozzle arrays for depositing a support material formulation.

Yet it is to be understood that it is not intended to limit the scope of the present invention and that the number of modeling material depositing heads (modeling heads) and the number of support material depositing heads (support heads) may differ. Generally, the number of modeling heads, the number of support heads and the number of nozzles in each respective head or head array are selected such as to provide a predetermined ratio, a, between the maximal dispensing rate of the support material formulation(s) and the maximal dispensing rate of modeling material formulation(s). The value of the predetermined ratio, a, is preferably selected to ensure that in each formed layer, the height of modeling material equals the height of support material. Typical values for a are from about 0.6 to about 1.5.

For example, for a=1, the overall dispensing rate of support material formulation is generally the same as the overall dispensing rate of the modeling material formulation(s) when all modeling heads and support heads operate.

In a preferred embodiment, there are M modeling heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature control unit and a material level sensor of its own, and receives an individually controlled voltage for its operation.

Apparatus 114 can further comprise a hardening (curing) device 324 which can include any device configured to emit light, heat or the like that may cause the deposited material to harden (may cause curing). For example, hardening device 324 can comprise one or more radiation sources, which can be, for example, an ultraviolet or visible or infrared lamp, or other sources of electromagnetic radiation, or electron beam source, depending on the modeling material being used. In some embodiments of the present invention, hardening device 324 serves for curing or solidifying the modeling material.

The dispensing head and radiation source are preferably mounted in a frame 128 which is preferably operative to reciprocally move over a tray 360, which serves as the working surface. In some embodiments of the present invention the radiation sources are mounted on the frame such that they follow in the wake of the dispensing heads to at least partially cure or solidify the materials just dispensed by the dispensing heads.

Tray 360 is positioned horizontally. According to the common conventions an X-Y-Z Cartesian coordinate system is selected such that the X-Y plane is parallel to tray 360. Tray 360 is preferably configured to move vertically (along the Z direction), typically downward. In various exemplary embodiments of the invention, apparatus 114 further comprises one or more leveling devices 132, e.g. a roller 326. Leveling device 326 serves to straighten, level and/or establish a thickness of the newly formed layer prior to the formation of the successive layer thereon. Leveling device 326 preferably comprises a waste collection device 136 for collecting the excess material generated during leveling. Waste collection device 136 may comprise any mechanism that delivers the material to a waste tank or waste cartridge.

In use, the dispensing heads of unit 16 move in a scanning direction, which is referred to herein as the X direction, and selectively dispense uncured building material in a predetermined configuration in the course of their passage over tray 360. The building material typically comprises one or more types of support material and one or more modeling material formulations. The passage of the dispensing heads of unit 16 is followed by the curing of the dispensed modeling material formulation(s) by radiation source 126. In the reverse passage of the heads, back to their starting point for the layer just deposited, an additional dispensing of (uncured) building material may be carried out, according to predetermined configuration. In the forward and/or reverse passages of the dispensing heads, the layer thus formed may be straightened by leveling device 326, which preferably follows the path of the dispensing heads in their forward and/or reverse movement. Once the dispensing heads return to their starting point along the X direction, they may move to another position along an indexing direction, referred to herein as the Y direction, and continue to build the same layer by reciprocal movement along the X direction. Alternately, the dispensing heads may move in the Y direction between forward and reverse movements or after more than one forward-reverse movement. The series of scans performed by the dispensing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the dispensing head of unit 16, within the layer. Such Z displacement is carried out in order to cause contact of the leveling device with the surface in one direction and prevent contact in the other direction.

System 110 optionally and preferably comprises a building material supply system 330 which comprises the building material containers or cartridges and supplies a plurality of building materials to fabrication apparatus 114.

A control unit 152 controls fabrication apparatus 114 and optionally and preferably also supply system 330. Control unit 152 typically includes an electronic circuit configured to perform the controlling operations. Control unit 152 preferably communicates with a data processor 154 which transmits digital data pertaining to fabrication instructions based on computer object data, e.g., a CAD configuration represented on a computer readable medium in a form of a Standard Tessellation Language (STL) format, a Stereo-Lithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). Typically, control unit 152 controls the voltage applied to each dispensing head or nozzle array and the temperature of the building material in the respective printing head.

Once the manufacturing data is loaded to control unit 152 it can operate without user intervention. In some embodiments, control unit 152 receives additional input from the operator, e.g., using data processor 154 or using a user interface 116 communicating with unit 152. User interface 116 can be of any type known in the art, such as, but not limited to, a keyboard, a touch screen and the like. For example, control unit 152 can receive, as additional input, one or more building material types and/or attributes, such as, but not limited to, color, characteristic distortion and/or transition temperature, viscosity, electrical property, magnetic property. Other attributes and groups of attributes are also contemplated.

Figure 1B:
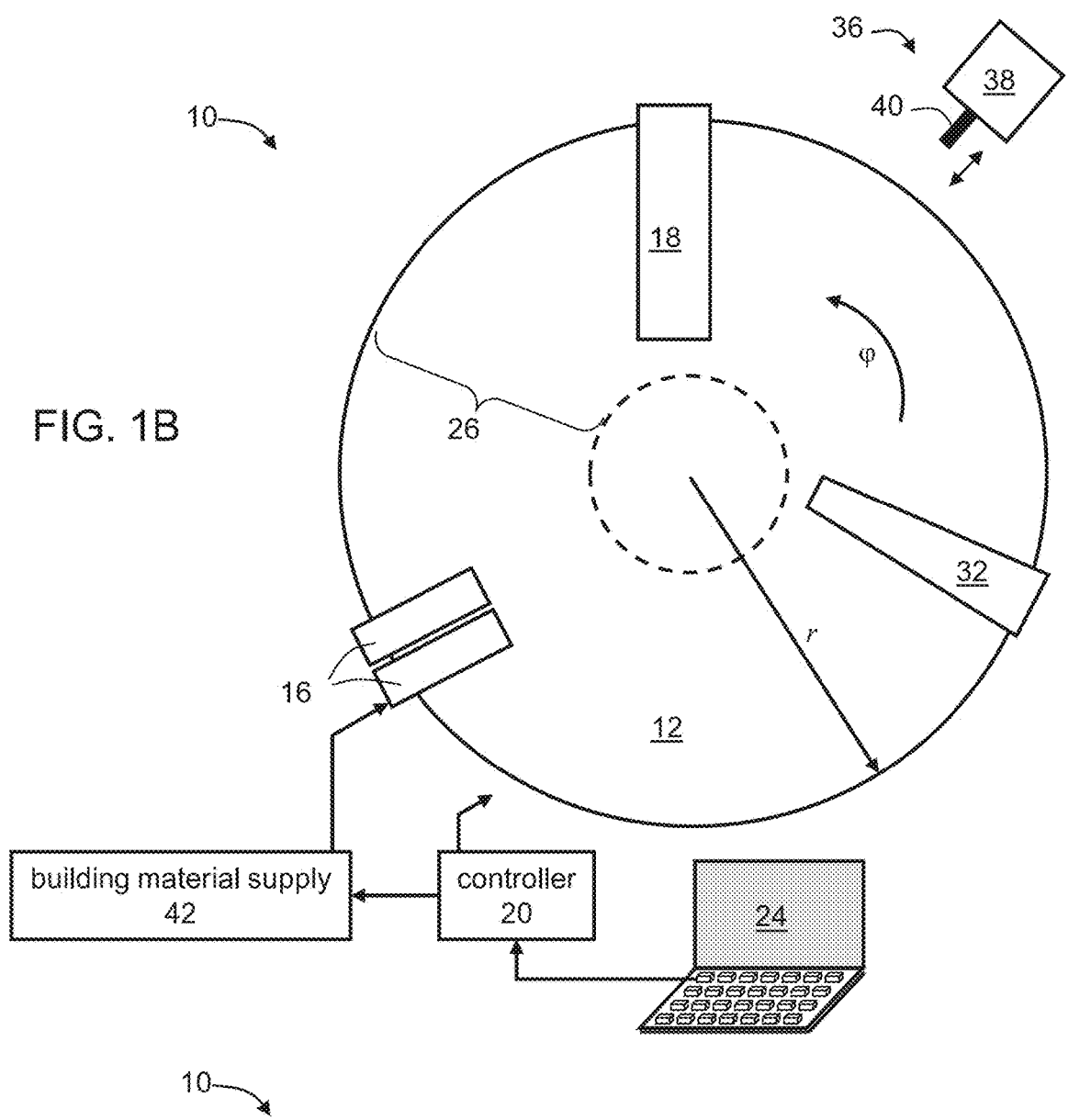
Figure 1C:
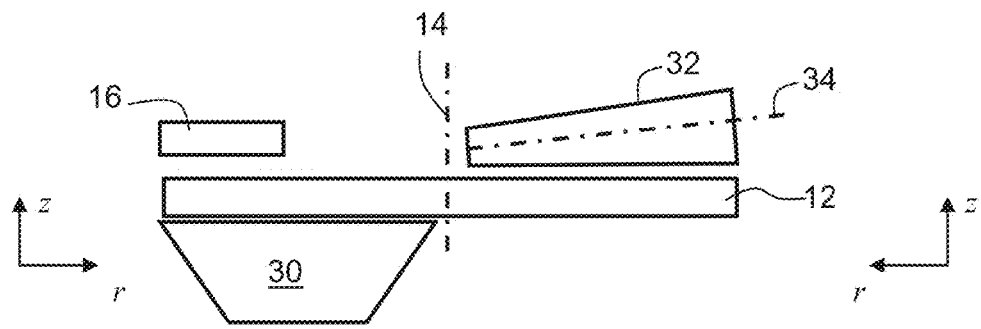
Figure 1D:
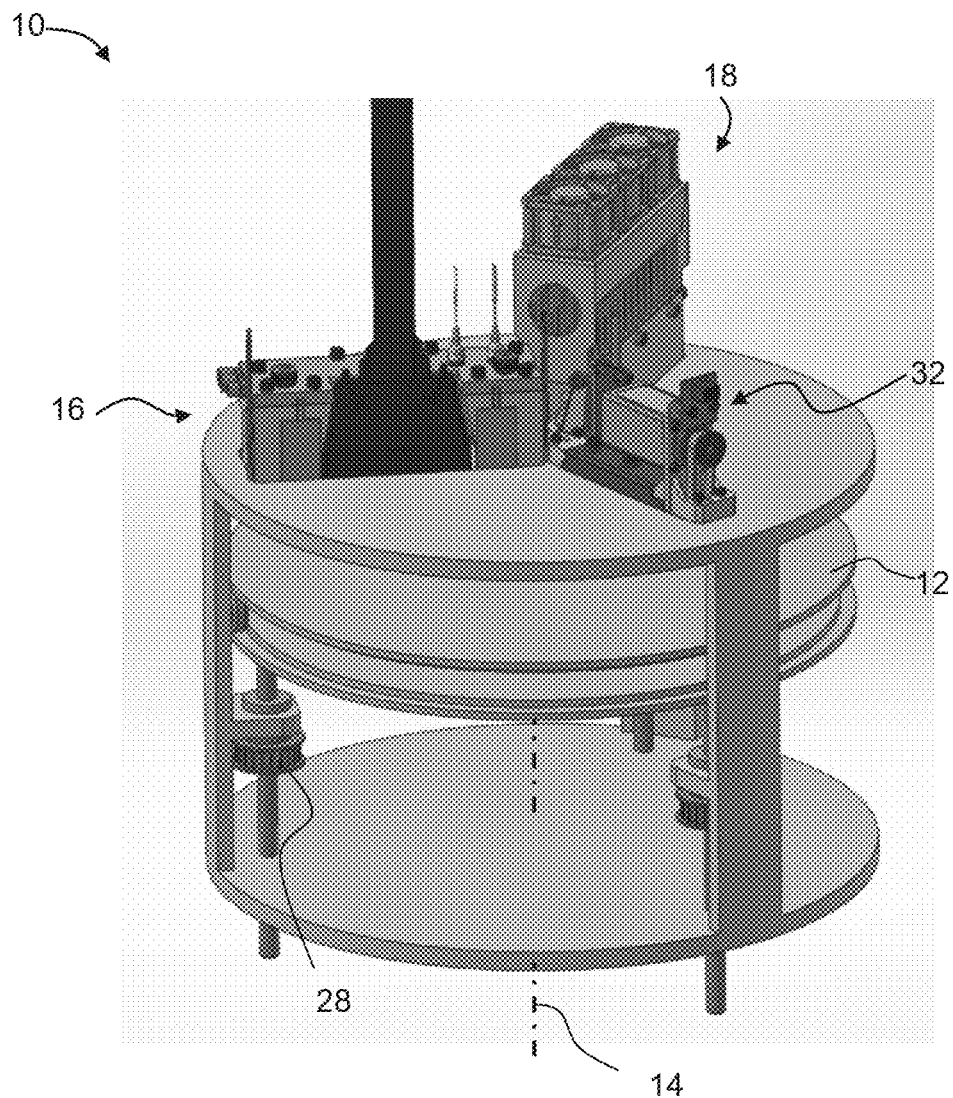

Another representative and non-limiting example of a system 10 suitable for AM of an object according to some embodiments of the present invention is illustrated in FIGS. 1B-D. FIGS. 1B-D illustrate a top view (FIG. 1B), a side view (FIG. 1C) and an isometric view (FIG. 1D) of system 10.

In the present embodiments, system 10 comprises a tray 12 and a plurality of inkjet printing heads 16, each having a plurality of separated nozzles. Tray 12 can have a shape of a disk or it can be annular. Non-round shapes are also contemplated, provided they can be rotated about a vertical axis.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While the embodiments below are described with a particular emphasis to configuration (i) wherein the tray is a rotary tray that is configured to rotate about vertical axis 14 relative to heads 16, it is to be understood that the present application contemplates also configurations (ii) and (iii). Any one of the embodiments described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction $\varphi$, and a direction perpendicular to tray 12 is referred to herein is the vertical direction z.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a supporting structure for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

Exemplified embodiments for the printing head 16 are illustrated in FIGS. 2A-2C. These embodiments can be employed for any of the AM systems described above, including, without limitation, system 110 and system 10.

FIGS. 2A-B illustrate a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably can be parallel to each other.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1$-$\varphi_2$, and the angle between the linear nozzle arrays of the two heads is also $\varphi_1$-$\varphi_2$.

In some embodiments, two or more printing heads can be assembled to a block of printing heads, in which case the printing heads of the block are typically parallel to each other. A block including several inkjet printing heads 16a, 16b, 16c is illustrated in FIG. 2C.

In some embodiments, system 10 comprises a support structure 30 positioned below heads 16 such that tray 12 is between support structure 30 and heads 16. Support structure 30 may serve for preventing or reducing vibrations of tray 12 that may occur while inkjet printing heads 16 operate. In configurations in which printing heads 16 rotate about axis 14, support structure 30 preferably also rotates such that support structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, support structure 30 preferably also moves vertically together with tray 12. In configurations in which the vertical distance is varied by heads 16 along the vertical direction, while maintaining the vertical position of tray 12 fixed, support structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

The operation of inkjet printing heads 16 and optionally and preferably also of one or more other components of system 10, e.g., the motion of tray 12, are controlled by a controller 20. The controller can has an electronic circuit and a non-volatile memory medium readable by the circuit, wherein the memory medium stores program instructions which, when read by the circuit, cause the circuit to perform control operations as further detailed below.

Controller 20 can also communicate with a host computer 24 which transmits digital data pertaining to fabrication instructions based on computer object data, e.g., in a form of STL, SLC format, VRML, AMF format, DXF, PLY or any other format suitable for CAD. The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

The transformation of coordinates allows three-dimensional printing over a rotating tray. In conventional three-dimensional printing, the printing heads reciprocally move above a stationary tray along straight lines. In such conventional systems, the printing resolution is the same at any point over the tray, provided the dispensing rates of the heads are uniform. Unlike conventional three-dimensional printing, not all the nozzles of the head points cover the same distance over tray 12 during at the same time. The transformation of coordinates is optionally and preferably executed so as to ensure equal amounts of excess material at different radial positions.

Typically, the controller 152 or 20 controls the voltage applied to the respective component of the system 10 based on the fabrication instructions and based on the stored program instructions as described below.

Generally, controller 152 or 20 controls printing heads 16 to dispense, during the rotation of tray 360 or 12, droplets of building material in layers, such as to print a three-dimensional object on tray 360 or 12.

System 10 or 110 optionally and preferably comprises one or more radiation sources 18, which provides curing energy and which can be, for example, an ultraviolet or visible or infrared lamp, or other sources of electromagnetic radiation, or electron beam source, depending on the modeling material formulation being used. Radiation source can include any type of radiation emitting device, including, without limitation, light emitting diode (LED), digital light processing (DLP) system, resistive lamp and the like. Radiation source 18 serves for curing or solidifying the modeling material. In various exemplary embodiments of the invention the operation of radiation source 18 is controlled by controller 20 which may activate and deactivate radiation source 18 and may optionally also control the amount of radiation generated by radiation source 18.

In some embodiments of the invention, system 10 further comprises one or more leveling devices 32 which can be manufactured as a roller or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 1C).

The conical roller can have the shape of a cone or a conical frustum.

The opening angle of the conical roller is preferably selected such that is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

In some embodiments of the present invention printing heads 16 of system 10 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Further details on the principles and operations of an AM system suitable for the present embodiments are found in U.S. Published Application No. 20100191360, the contents of which are hereby incorporated by reference.

Figure 3:
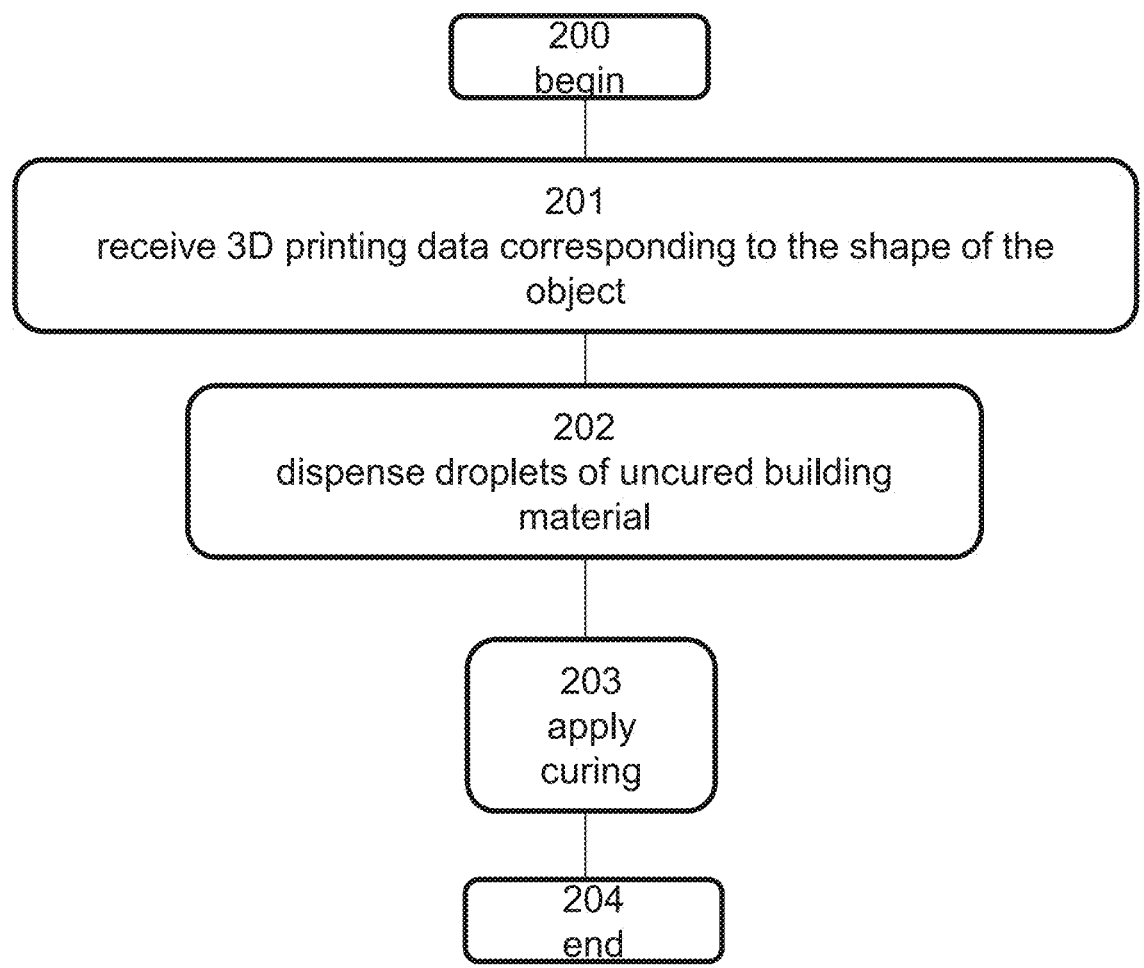
FIG. 3 is a flowchart diagram of a method suitable for fabricating an object by additive manufacturing according to aspects of some embodiments of the present invention.

The Method:

FIG. 3 presents a flowchart describing an exemplary method according to some embodiments of the present invention.

It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

Computer programs implementing the method of the present embodiments can commonly be distributed to users on a distribution medium such as, but not limited to, a floppy disk, a CD-ROM, a flash memory device and a portable hard drive. From the distribution medium, the computer programs can be copied to a hard disk or a similar intermediate storage medium. The computer programs can be run by loading the computer instructions either from their distribution medium or their intermediate storage medium into the execution memory of the computer, configuring the computer to act in accordance with the method of this invention. All these operations are well-known to those skilled in the art of computer systems.

The computer implemented method of the present embodiments can be embodied in many forms. For example, it can be embodied in on a tangible medium such as a computer for performing the method operations. It can be embodied on a computer readable medium, comprising computer readable instructions for carrying out the method operations. In can also be embodied in electronic device having digital computer capabilities arranged to run the computer program on the tangible medium or execute the instruction on a computer readable medium.

The method begins at 200 and optionally and preferably continues to 201 at which computer object data (e.g., 3D printing data) corresponding to the shape of the object are received. The data can be received, for example, from a host computer which transmits digital data pertaining to fabrication instructions based on computer object data, e.g., in a form of STL, SLC format, VRML, AMF format, DXF, PLY or any other format suitable for CAD.

The method continues to 202 at which droplets of the uncured building material as described herein (e.g., one or more modeling material formulations as described herein and optionally a support material formulation) are dispensed in layers, on a receiving medium, optionally and preferably using an AM system, such as, but not limited to, system 110 or system 10, according to the computer object data (e.g., printing data), and as described herein. In any of the embodiments described herein the dispensing 202 is by at least two different multi-nozzle inkjet printing heads The receiving medium can be a tray of an AM system (e.g., tray 360 or 12) as described herein or a previously deposited layer.

In some embodiments of the present invention, the dispensing 202 is effected under ambient environment.

Optionally, before being dispensed, the uncured building material, or a part thereof (e.g., one or more formulations of the building material), is heated, prior to being dispensed. These embodiments are particularly useful for uncured building material formulations having relatively high viscosity at the operation temperature of the working chamber of a 3D inkjet printing system. The heating of the formulation(s) is preferably to a temperature that allows jetting the respective formulation through a nozzle of a printing head of a 3D inkjet printing system. In some embodiments of the present invention, the heating is to a temperature at which the respective formulation exhibits a viscosity of no more than X centipoises, where X is about 30 centipoises, preferably about 25 centipoises and more preferably about 20 centipoises, or 18 centipoises, or 16 centipoises, or 14 centipoises, or 12 centipoises, or 10 centipoises, or even lower.

The heating can be executed before loading the respective formulation into the printing head of the AM (e.g., 3D inkjet printing) system, or while the formulation is in the printing head or while the composition passes through the nozzle of the printing head.

In some embodiments, the heating is executed before loading of the respective formulation into the dispensing (e.g., inkjet printing) head, so as to avoid clogging of the dispensing (e.g., inkjet printing) head by the formulation in case its viscosity is too high.

In some embodiments, the heating is executed by heating the dispensing (e.g., inkjet printing) heads, at least while passing the modeling material formulation(s) through the nozzle of the dispensing (e.g., inkjet printing) head.

Once the uncured building material is dispensed on the receiving medium according to the computer object data (e.g., printing data), the method optionally and preferably continues to 203 at which curing energy is applied to the deposited layers, e.g., by means of a radiation source as described herein. Preferably, the curing is applied to each individual layer following the deposition of the layer and prior to the deposition of the previous layer.

In some embodiments, applying a curing energy is effected under a generally dry and inert environment, as described herein.

The method ends at 204.

In some embodiments, the method is executed using an exemplary system as described herein in any of the respective embodiments and any combination thereof.

The modeling material formulation(s) can be contained in a particular container or cartridge of a solid freeform fabrication apparatus or a combination of modeling material formulations deposited from different containers of the apparatus.

In some embodiments, at least one, or at least a few (e.g., at least 10, at least 20, at least 30 at least 40, at least 50, at least 60, at least 80, or more), or all, of the layers is/are formed by dispensing droplets, as in 202, of a single modeling material formulation, as described herein in any of the respective embodiments.

In some embodiments, at least one, or at least a few (e.g., at least 10, at least 20, at least 30 at least 40, at least 50, at least 60, at least 80, or more), or all, of the layers is/are formed by dispensing droplets, as in 202, of two or more modeling material formulations, as described herein in any of the respective embodiments, each from a different dispensing (e.g., inkjet printing) head.

These embodiments provide, inter alia, the ability to select materials from a given number of materials and define desired combinations of the selected materials and their properties. According to the present embodiments, the spatial locations of the deposition of each material with the layer is defined, either to effect occupation of different three-dimensional spatial locations by different materials, or to effect occupation of substantially the same three-dimensional location or adjacent three-dimensional locations by two or more different materials so as to allow post deposition spatial combination of the materials within the layer, thereby to form a composite material at the respective location or locations.

Any post deposition combination or mix of modeling materials is contemplated. For example, once a certain material is dispensed it may preserve its original properties. However, when it is dispensed simultaneously with another modeling material or other dispensed materials which are dispensed at the same or nearby locations, a composite material having a different property or properties to the dispensed materials is formed.

Some of the embodiments thus enable the deposition of a broad range of material combinations, and the fabrication of an object which may consist of multiple different combinations of materials, in different parts of the object, according to the properties desired to characterize each part of the object.

In some of these embodiments, the two or more modeling material formulations are dispensed in a voxelated manner, wherein voxels of one of said modeling material formulations are interlaced with voxels of at least one another modeling material formulation.

Some embodiments thus provide a method of layerwise fabrication of a three-dimensional object, in which for each of at least a few (e.g., at least two or at least three or at least 10 or at least 20 or at least 40 or at least 80) of the layers or all the layers, two or more modeling formulations are dispensed, optionally and preferably using system 10 or system 110. Each modeling formulation is preferably dispensed by jetting it out of a plurality of nozzles of a printing head (e.g., head 16). The dispensing is in a voxelated manner, wherein voxels of one of said modeling material formulations are interlaced with voxels of at least one another modeling material formulation, according to a predetermined voxel ratio.

Figure 4:
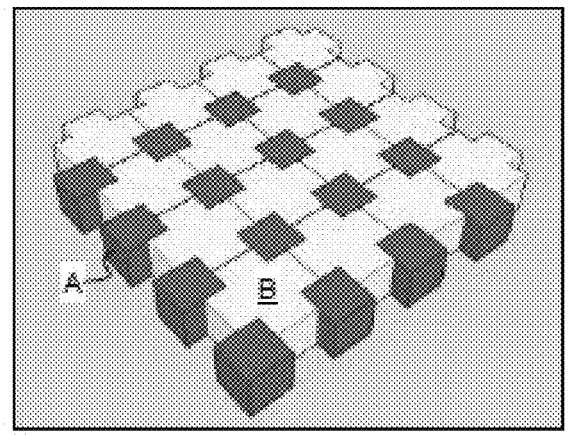
FIG. 4 is a schematic illustration of a region which includes interlaced modeling materials.

Such a combination of two modeling material formulations at a predetermined voxel ratio is referred to as digital material (DM). A representative example of a digital material is illustrated in FIG. 4, showing materials A and B which are interlaced over a region of a layer in a voxelated manner.

In some embodiments, dispensing two modeling material formulations at a predetermined voxel ratio allows obtaining rubbery-like materials featuring mechanical properties as desired. For example, by manipulating the voxel ratio, a series of rubbery-like digital material featuring various Shore A hardness values can be obtained, in a controllable digital manner.

For any predetermined ratio of the materials, a digital material can be formed for example, by ordered or random interlacing. Also contemplated are embodiments in which the interlacing is semi-random, for example, a repetitive pattern of sub-regions wherein each sub-region comprises random interlacing.

In some of any of the embodiments described herein, when droplets of two or more modeling material formulations are dispensed, in each of at least a few layers, as described herein, the dispensing is such that forms a core region and one or more envelope regions at least partially surrounding said core region. Such a dispensing results in fabrication of an object constructed from a plurality of layers and a layered core constituting core regions and a layered shell constituting envelope regions.

The structure according to some of these embodiments is a shelled structure made of two or more curable materials. The structure typically comprises a layered core which is at least partially coated by one or more layered shells such that at least one layer of the core engages the same plane with a layer of at least one of the shells. The thickness of each shell, as measured perpendicularly to the surface of the structure, is typically at least 10 μm. In various exemplary embodiments, the core and the shell are different from each other in their thermo-mechanical properties. This is readily achieved by fabricating the core and shell from different modeling material formulations or different combinations of modeling material formulations. The thermo-mechanical properties of the core and shell are referred to herein as "core thermo-mechanical properties" and "shell thermo-mechanical properties," respectively.

A representative and non-limiting example of a structure according to some embodiments of the present invention is shown in FIGS. 5A-D.

FIG. 5A is a schematic illustration of a perspective view a structure 60, and FIG. 5B is a cross-sectional view of structure 60 along line A-A of FIG. 5A. For clarity of presentation a Cartesian coordinate system is also illustrated.

Structure 60 comprises a plurality of layers 62 stacked along the z direction. Structure 60 is typically fabricated by an AM technique, e.g., using system 10 or 110, whereby the layers are formed in a sequential manner. Thus, the z direction is also referred to herein as the "build direction" of the structure. Layers 62 are, therefore, perpendicular to the build direction. Although structure 60 is shown as a cylinder, this need not necessarily be the case, since the structure of the present embodiments can have any shape.

The shell and core of structure 60 are shown at 64 and 66, respectively. As shown, the layers of core 66 and the layers of shell 64 are co-planar. The AM technique allows the simultaneous fabrication of shell 64 and core 66, whereby for a particular formed layer, the inner part of the layer constitutes a layer of the core, and the periphery of the layer, or part thereof, constitutes a layer of the shell.

A peripheral section of a layer which contributes to shell 64 is referred to herein as an "envelope region" of the layer. In the non-limiting example of FIGS. 5A and 5B, each of layers 62 has an envelope region. Namely, each layer in FIGS. 5A and 2B contributes both to the core and to the shell. However, this need not necessarily be the case, since, for some applications, it may be desired to have the core exposed to the environment in some regions. In these applications, at least some of the layers do not include an envelope region. A representative example of such configuration is illustrated in the cross-sectional view of FIG. 5C, showing some layers 68 which contribute to the core but not to the shell, and some layers 70 which contribute to both the core and the shell. In some embodiments, one or more layers do not include a region with core thermo-mechanical properties and comprise only a region with shell thermo-mechanical properties. These embodiments are particularly useful when the structure has one or more thin parts, wherein the layers forming those parts of the structure are preferably devoid of a core region. Also contemplated are embodiments in which one or more layers do not include a region with shell thermo-mechanical properties and comprise only a region with core thermo-mechanical properties.

The shell can, optionally and preferably, also cover structure 60 from above and/or below, relative to the z direction. In these embodiments, some layers at the top most and/or bottom most parts of structure 60 have at least one material property which is different from core 66. In various exemplary embodiments of the invention the top most and/or bottom most parts of structure 60 have the same material property as shell 64. A representative example of this embodiment is illustrated in FIG. 5D. The top/bottom shell of structure 60 may be thinner (e.g., 2 times thinner) than the side shell, e.g. when the top or bottom shell comprises a layer above or below the structure, and therefore has the same thickness as required for layers forming the object.

In some embodiments of the present invention both the core and the shell are rubber-like materials.

In some embodiments of the present invention both the core and the shell are DM materials.

When both the core and shell are made of a DM composed of the same modeling material formulations, the relative surface density of any of the modeling materials in the core is different from the relative surface density of that material in the shell or envelope region. In some embodiments, however, the core is formed from a DM and the shell is formed of a single modeling material formulation or vice versa.

In various exemplary embodiments of the invention the thickness of the shell, as measured in the x-y plane (perpendicularly to the build direction z) is non-uniform across the build direction. In other words, different layers of the structure may have envelope regions of different widths. For example, the thickness of the shell along a direction parallel to the x-y plane can be calculated as a percentage of the diameter of the respective layer along that direction, thus making the thickness dependent on the size of the layer. In various exemplary embodiments of the invention the thickness of the shell is non-uniform across a direction which is tangential to the outer surface of the shell and perpendicular to the build direction. In terms of the structure's layers, these embodiments correspond to an envelope region having a width which is non-uniform along the periphery of the respective layer.

In some embodiments of the present invention the shell of the structure, or part thereof, is by itself a 'shelled' structure, comprising more than envelope region. Specifically in these embodiments, the structure comprises an inner core, at least partially surrounded by at least one intermediate envelope region, wherein the intermediate envelope(s) is surrounded by an outer envelope region. The thickness of the intermediate envelope region(s), as measured perpendicularly to the build direction, is optionally and preferably larger (e.g., 10 times larger) than the thickness of the outermost envelope region. In these embodiments, the intermediate envelope region(s) serves as a shell of the structure and therefore has the properties of the shell as further detailed hereinabove. The outermost envelope shell may also serve for protecting the intermediate envelope(s) from breakage under load.

The structure of the present embodiments can be formed, as stated, in a layerwise manner, for example, using system 10 or 110 described above. In various exemplary embodiments of the invention a computer implemented method automatically performs dynamic adaptation of the shell to the specific elements of the structure. The method can optionally and preferably employ user input to calculate the shell for each region of the structure and assigns the voxels of the outer surfaces to the respective modeling material or combination of modeling materials. The computer implemented method can be executed by a control unit which controls the solid freeform fabrication apparatus (e.g., control unit 152 or 20 see FIGS. 1A and 1B) via a data processor (e.g., data processor 154 or 24).

In some embodiments of the present invention one or more additional shell layers are dispensed so as to form a shell also at the top most and/or bottom most parts of the structure. These layers are preferably devoid of a core region since they serve for shelling the core from above or from below. When it is desired to shell the core from above, the additional shell layer(s) are dispensed on top of all other layers, and when it is desired to shell the core from below, the additional layer(s) are dispensed on the working surface (e.g., tray 360 or 12, see FIGS. 1A and 1B) while all other layers are dispensed thereafter.

Any of the envelope regions optionally has a width of at least 10 μm. Preferably, all the envelope regions have a width of at least 10 μm.

Any of the core and envelope regions, and optionally also the top most and/or bottom most additional layers, may be fabricated using modeling material formulations or combinations of modeling material formulations (e.g., digital materials) as described herein.

In some embodiments of this invention, the shell is fabricated selectively in different regions of the structure so as to change the material properties only in selected regions areas without affecting the mechanical properties of other regions.

In some of any of the embodiments of the present invention, once the layers are dispensed as described herein, exposure to curing energy as described herein is effected. In some embodiments, the curable materials are UV-curable materials and the curing energy is such that the radiation source emits UV radiation.

In some embodiments, where the building material comprises also support material formulation(s), the method proceeds to removing the support material formulation. This can be performed by mechanical and/or chemical means, as would be recognized by any person skilled in the art.

The Object:

Embodiments of the present invention provide three-dimensional objects comprising in at least a portion thereof an elastomeric material.

When the object is made of a single modeling material formulation, as described herein, it features mechanical properties as described herein for a modeling material formulation, when hardened (cured).

In some embodiments, the object is made of two of more modeling material formulations, and in some of these embodiments, at least a portion of the object is made of digital materials, as described herein. In some embodiments, the object comprises a core-shell structure as described herein in any of the respective embodiments, and features properties in accordance with the selected materials and structure.

In some embodiments, the object is made of different elastomeric materials at different portions thereof (e.g., two or more portions thereof), and each of these portion features a different property (for example, a different Shore A Hardness, a different Modulus, etc.), as desired.

It is expected that during the life of a patent maturing from this application many relevant elastomeric curable materials, other curable materials and silica particles will be developed and the scope of the terms "elastomeric curable material", "curable material" and "silica particles" is intended to include all such new technologies a priori.

As used herein the term "about" refers to ±10% or ±5%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

Herein throughout, the term "(meth)acrylic" encompasses acrylic and methacrylic compounds.

Herein throughout, the phrase "linking moiety" or "linking group" describes a group that connects two or more moieties or groups in a compound. A linking moiety is typically derived from a bi- or tri-functional compound, and can be regarded as a bi- or tri-radical moiety, which is connected to two or three other moieties, via two or three atoms thereof, respectively.

Exemplary linking moieties include a hydrocarbon moiety or chain, optionally interrupted by one or more heteroatoms, as defined herein, and/or any of the chemical groups listed below, when defined as linking groups.

When a chemical group is referred to herein as "end group" it is to be interpreted as a substituent, which is connected to another group via one atom thereof.

Herein throughout, the term "hydrocarbon" collectively describes a chemical group composed mainly of carbon and hydrogen atoms. A hydrocarbon can be comprised of alkyl, alkene, alkyne, aryl, and/or cycloalkyl, each can be substituted or unsubstituted, and can be interrupted by one or more heteroatoms. The number of carbon atoms can range from 2 to 20, and is preferably lower, e.g., from 1 to 10, or from 1 to 6, or from 1 to 4. A hydrocarbon can be a linking group or an end group.

Bisphenol A is an example of a hydrocarbon comprised of 2 aryl groups and one alkyl group.

As used herein, the term "amine" describes both a —NR'R" group and a —NR'— group, wherein R' and R" are each independently hydrogen, alkyl, cycloalkyl, aryl, as these terms are defined hereinbelow.

The amine group can therefore be a primary amine, where both R' and R" are hydrogen, a secondary amine, where R' is hydrogen and R" is alkyl, cycloalkyl or aryl, or a tertiary amine, where each of R' and R" is independently alkyl, cycloalkyl or aryl.

Alternatively, R' and R" can each independently be hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, carbonyl, C-carboxylate, O-carboxylate, N-thiocarbamate, O-thiocarbamate, urea, thiourea, N-carbamate, O-carbamate, C-amide, N-amide, guanyl, guanidine and hydrazine.

The term "amine" is used herein to describe a —NR'R" group in cases where the amine is an end group, as defined hereinunder, and is used herein to describe a —NR'— group in cases where the amine is a linking group or is or part of a linking moiety.

The term "alkyl" describes a saturated aliphatic hydrocarbon including straight chain and branched chain groups. Preferably, the alkyl group has 1 to 30, or 1 to 20 carbon atoms. Whenever a numerical range; e.g., "1-20", is stated herein, it implies that the group, in this case the alkyl group, may contain 1 carbon atom, 2 carbon atoms, 3 carbon atoms, etc., up to and including 20 carbon atoms. The alkyl group may be substituted or unsubstituted. Substituted alkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine.

The alkyl group can be an end group, as this phrase is defined hereinabove, wherein it is attached to a single adjacent atom, or a linking group, as this phrase is defined hereinabove, which connects two or more moieties via at least two carbons in its chain. When the alkyl is a linking group, it is also referred to herein as "alkylene" or "alkylene chain".

Herein, a C(1-4) alkyl, substituted by a hydrophilic group, as defined herein, is included under the phrase "hydrophilic group" herein.

Alkene and Alkyne, as used herein, are an alkyl, as defined herein, which contains one or more double bond or triple bond, respectively.

The term "cycloalkyl" describes an all-carbon monocyclic ring or fused rings (i.e., rings which share an adjacent pair of carbon atoms) group where one or more of the rings does not have a completely conjugated pi-electron system. Examples include, without limitation, cyclohexane, adamantine, norbornyl, isobornyl, and the like. The cycloalkyl group may be substituted or unsubstituted. Substituted cycloalkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The cycloalkyl group can be an end group, as this phrase is defined hereinabove, wherein it is attached to a single adjacent atom, or a linking group, as this phrase is defined hereinabove, connecting two or more moieties at two or more positions thereof.

Cycloalkyls of 1-6 carbon atoms, substituted by two or more hydrophilic groups, as defined herein, is included under the phrase "hydrophilic group" herein.

The term "heteroalicyclic" describes a monocyclic or fused ring group having in the ring(s) one or more atoms such as nitrogen, oxygen and sulfur. The rings may also have one or more double bonds. However, the rings do not have a completely conjugated pi-electron system. Representative examples are piperidine, piperazine, tetrahydrofuran, tetrahydropyrane, morpholino, oxalidine, and the like.

The heteroalicyclic may be substituted or unsubstituted. Substituted heteroalicyclic may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroalicyclic group can be an end group, as this phrase is defined hereinabove, where it is attached to a single adjacent atom, or a linking group, as this phrase is defined hereinabove, connecting two or more moieties at two or more positions thereof.

A heteroalicyclic group which includes one or more of electron-donating atoms such as nitrogen and oxygen, and in which a numeral ratio of carbon atoms to heteroatoms is 5:1 or lower, is included under the phrase "hydrophilic group" herein.

The term "aryl" describes an all-carbon monocyclic or fused-ring polycyclic (i.e., rings which share adjacent pairs of carbon atoms) groups having a completely conjugated pi-electron system. The aryl group may be substituted or unsubstituted. Substituted aryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The aryl group can be an end group, as this term is defined hereinabove, wherein it is attached to a single adjacent atom, or a linking group, as this term is defined hereinabove, connecting two or more moieties at two or more positions thereof.

The term "heteroaryl" describes a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Examples, without limitation, of heteroaryl groups include pyrrole, furan, thiophene, imidazole, oxazole, thiazole, pyrazole, pyridine, pyrimidine, quinoline, isoquinoline and purine. The heteroaryl group may be substituted or unsubstituted. Substituted heteroaryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroaryl group can be an end group, as this phrase is defined hereinabove, where it is attached to a single adjacent atom, or a linking group, as this phrase is defined hereinabove, connecting two or more moieties at two or more positions thereof. Representative examples are pyridine, pyrrole, oxazole, indole, purine and the like.

The term "halide" and "halo" describes fluorine, chlorine, bromine or iodine.

The term "haloalkyl" describes an alkyl group as defined above, further substituted by one or more halide.

The term "sulfate" describes a —O—S(=O)$_2$—OR' end group, as this term is defined hereinabove, or an —O—S(=O)$_2$—O— linking group, as these phrases are defined hereinabove, where R' is as defined hereinabove.

The term "thiosulfate" describes a —O—S(=S)(=O)—OR' end group or a —O—S(=S)(=O)—O— linking group, as these phrases are defined hereinabove, where R' is as defined hereinabove.

The term "sulfite" describes an —O—S(=O)—O—R' end group or a —O—S(=O)—O— group linking group, as these phrases are defined hereinabove, where R' is as defined hereinabove.

The term "thiosulfite" describes a —O—S(=S)—O—R' end group or an —O—S(=S)—O— group linking group, as these phrases are defined hereinabove, where R' is as defined hereinabove.

The term "sulfinate" describes a —S(=O)—OR' end group or an —S(=O)—O— group linking group, as these phrases are defined hereinabove, where R' is as defined hereinabove.

The term "sulfoxide" or "sulfinyl" describes a —S(=O)R' end group or an —S(=O)— linking group, as these phrases are defined hereinabove, where R' is as defined hereinabove.

The term "sulfonate" describes a —S(=O)$_2$—R' end group or an —S(=O)$_2$— linking group, as these phrases are defined hereinabove, where R' is as defined herein.

The term "S-sulfonamide" describes a —S(=O)$_2$—NR'R" end group or a —S(=O)$_2$—NR'— linking group, as these phrases are defined hereinabove, with R' and R" as defined herein.

The term "N-sulfonamide" describes an R'S(=O)$_2$—NR"— end group or a —S(=O)$_2$—NR'— linking group, as these phrases are defined hereinabove, where R' and R" are as defined herein.

The term "disulfide" refers to a —S—SR' end group or a —S—S— linking group, as these phrases are defined hereinabove, where R' is as defined herein.

The term "phosphonate" describes a —P(=O)(OR')(OR") end group or a —P(=O)(OR')(O)— linking group, as these phrases are defined hereinabove, with R' and R" as defined herein.

The term "thiophosphonate" describes a —P(=S)(OR')(OR") end group or a —P(=S)(OR')(O)— linking group, as these phrases are defined hereinabove, with R' and R" as defined herein.

The term "phosphinyl" describes a —PR'R" end group or a —PR'— linking group, as these phrases are defined hereinabove, with R' and R" as defined hereinabove.

The term "phosphine oxide" describes a —P(=O)(R')(R") end group or a —P(=O)(R')— linking group, as these phrases are defined hereinabove, with R' and R" as defined herein.

The term "phosphine sulfide" describes a —P(=S)(R')(R") end group or a —P(=S)(R')— linking group, as these phrases are defined hereinabove, with R' and R" as defined herein.

The term "phosphite" describes an —O—PR'(=O)(OR") end group or an —O—PH(=O)(O)— linking group, as these phrases are defined hereinabove, with R' and R" as defined herein.

The term "carbonyl" or "carbonate" as used herein, describes a —C(=O)—R' end group or a —C(=O)— linking group, as these phrases are defined hereinabove, with R' as defined herein.

The term "thiocarbonyl" as used herein, describes a —C(=S)—R' end group or a —C(=S)— linking group, as these phrases are defined hereinabove, with R' as defined herein.

The term "oxo" as used herein, describes a (=O) group, wherein an oxygen atom is linked by a double bond to the atom (e.g., carbon atom) at the indicated position.

The term "thiooxo" as used herein, describes a (=S) group, wherein a sulfur atom is linked by a double bond to the atom (e.g., carbon atom) at the indicated position.

The term "oxime" describes a =N—OH end group or a =N—O— linking group, as these phrases are defined hereinabove.

The term "hydroxyl" describes a —OH group.

The term "alkoxy" describes both an —O-alkyl and an —O-cycloalkyl group, as defined herein.

The term "aryloxy" describes both an —O-aryl and an —O-heteroaryl group, as defined herein.

The term "thiohydroxy" describes a —SH group.

The term "thioalkoxy" describes both a —S-alkyl group, and a —S-cycloalkyl group, as defined herein.

The term "thioaryloxy" describes both a —S-aryl and a —S-heteroaryl group, as defined herein.

The "hydroxyalkyl" is also referred to herein as "alcohol", and describes an alkyl, as defined herein, substituted by a hydroxy group.

The term "cyano" describes a —C≡N group.

The term "isocyanate" describes an —N=C=O group.

The term "isothiocyanate" describes an —N=C=S group.

The term "nitro" describes an —NO$_2$ group.

The term "acyl halide" describes a —(C=O)R"" group wherein R"" is halide, as defined hereinabove.

The term "azo" or "diazo" describes an —N=NR' end group or an —N=N— linking group, as these phrases are defined hereinabove, with R' as defined hereinabove.

The term "peroxo" describes an —O—OR' end group or an —O—O— linking group, as these phrases are defined hereinabove, with R' as defined hereinabove.

The term "carboxylate" as used herein encompasses C-carboxylate and O—carboxylate.

The term "C-carboxylate" describes a —C(=O)—OR' end group or a —C(=O)—O— linking group, as these phrases are defined hereinabove, where R' is as defined herein.

The term "O-carboxylate" describes a —OC(=O)R' end group or a —OC(=O)— linking group, as these phrases are defined hereinabove, where R' is as defined herein.

A carboxylate can be linear or cyclic. When cyclic, R' and the carbon atom are linked together to form a ring, in C-carboxylate, and this group is also referred to as lactone. Alternatively, R' and O are linked together to form a ring in O-carboxylate. Cyclic carboxylates can function as a linking group, for example, when an atom in the formed ring is linked to another group.

The term "thiocarboxylate" as used herein encompasses C-thiocarboxylate and O-thiocarboxylate.

The term "C-thiocarboxylate" describes a —C(=S)—OR' end group or a —C(=S)—O— linking group, as these phrases are defined hereinabove, where R' is as defined herein.

The term "O-thiocarboxylate" describes a —OC(=S)R' end group or a —OC(=S)— linking group, as these phrases are defined hereinabove, where R' is as defined herein.

A thiocarboxylate can be linear or cyclic. When cyclic, R' and the carbon atom are linked together to form a ring, in C-thiocarboxylate, and this group is also referred to as thiolactone. Alternatively, R' and O are linked together to form a ring in O-thiocarboxylate. Cyclic thiocarboxylates can function as a linking group, for example, when an atom in the formed ring is linked to another group.

The term "carbamate" as used herein encompasses N-carbamate and O-carbamate.

The term "N-carbamate" describes an R"OC(=O)—NR'— end group or a —OC(=O)—NR'— linking group, as these phrases are defined hereinabove, with R' and R" as defined herein.

The term "O-carbamate" describes an —OC(=O)—NR'R" end group or an —OC(=O)—NR'— linking group, as these phrases are defined hereinabove, with R' and R" as defined herein.

A carbamate can be linear or cyclic. When cyclic, R' and the carbon atom are linked together to form a ring, in O-carbamate. Alternatively, R' and O are linked together to form a ring in N-carbamate. Cyclic carbamates can function as a linking group, for example, when an atom in the formed ring is linked to another group.

The term "carbamate" as used herein encompasses N-carbamate and O-carbamate.

The term "thiocarbamate" as used herein encompasses N-thiocarbamate and O-thiocarbamate.

The term "O-thiocarbamate" describes a —OC(=S)—NR'R" end group or a —OC(=S)—NR'— linking group, as these phrases are defined hereinabove, with R' and R" as defined herein.

The term "N-thiocarbamate" describes an R"OC(=S)NR'— end group or a —OC(=S)NR'— linking group, as these phrases are defined hereinabove, with R' and R" as defined herein.

Thiocarbamates can be linear or cyclic, as described herein for carbamates.

The term "dithiocarbamate" as used herein encompasses S-dithiocarbamate and N-dithiocarbamate.

The term "S-dithiocarbamate" describes a —SC(=S)—NR'R" end group or a —SC(=S)NR'— linking group, as these phrases are defined hereinabove, with R' and R" as defined herein.

The term "N-dithiocarbamate" describes an R"SC(=S)NR'— end group or a —SC(=S)NR'— linking group, as these phrases are defined hereinabove, with R' and R" as defined herein.

The term "urea", which is also referred to herein as "ureido", describes a —NR'C(=O)—NR"R'" end group or a —NR'C(=O)—NR"— linking group, as these phrases are defined hereinabove, where R' and R" are as defined herein and R'" is as defined herein for R' and R".

The term "thiourea", which is also referred to herein as "thioureido", describes a —NR'—C(=S)—NR"R'" end group or a —NR'—C(=S)—NR"— linking group, with R', R" and R'" as defined herein.

The term "amide" as used herein encompasses C-amide and N-amide.

The term "C-amide" describes a —C(=O)—NR'R" end group or a —C(=O)—NR'— linking group, as these phrases are defined hereinabove, where R' and R" are as defined herein.

The term "N-amide" describes a R'C(=O)—NR"— end group or a R'C(=O)—N— linking group, as these phrases are defined hereinabove, where R' and R" are as defined herein.

An amide can be linear or cyclic. When cyclic, R' and the carbon atom are linked together to form a ring, in C-amide, and this group is also referred to as lactam. Cyclic amides can function as a linking group, for example, when an atom in the formed ring is linked to another group.

The term "guanyl" describes a R'R"NC(=N)— end group or a —R'NC(=N)— linking group, as these phrases are defined hereinabove, where R' and R" are as defined herein.

The term "guanidine" describes a —R'NC(=N)—NR"R'" end group or a —R'NC(=N)—NR"— linking group, as these phrases are defined hereinabove, where R', R" and R'" are as defined herein.

The term "hydrazine" describes a —NR'—NR"R'" end group or a —NR'—NR"— linking group, as these phrases are defined hereinabove, with R', R", and R'" as defined herein.

As used herein, the term "hydrazide" describes a —C(=O)—NR'—NR"R'" end group or a —C(=O)—NR'—NR"— linking group, as these phrases are defined hereinabove, where R', R" and R'" are as defined herein.

As used herein, the term "thiohydrazide" describes a —C(=S)—NR'—NR"R'" end group or a —C(=S)—NR'—NR"— linking group, as these phrases are defined hereinabove, where R', R" and R'" are as defined herein.

As used herein, the term "alkylene glycol" describes a —O—[(CR'R")$_z$—O]$_y$—R'" end group or a —O—[(CR'R")$_z$—O]$_y$— linking group, with R', R" and R'" being as defined herein, and with z being an integer of from 1 to 10, preferably, from 2 to 6, more preferably 2 or 3, and y being an integer of 1 or more. Preferably R' and R" are both hydrogen. When z is 2 and y is 1, this group is ethylene glycol. When z is 3 and y is 1, this group is propylene glycol. When y is 2-4, the alkylene glycol is referred to herein as oligo(alkylene glycol).

When y is greater than 4, the alkylene glycol is referred to herein as poly(alkylene glycol). In some embodiments of the present invention, a poly(alkylene glycol) group or moiety can have from 10 to 200 repeating alkylene glycol units, such that z is 10 to 200, preferably 10-100, more preferably 10-50.

The term "silanol" describes a —Si(OH)R'R" group, or —Si(OH)$_2$R' group or —Si(OH)$_3$ group, with R' and R" as described herein.

The term "silyl" describes a —SiR'R"R'" group, with R', R" and R'" as described herein.

As used herein, the term "urethane" or "urethane moiety" or "urethane group" describes a Rx-O—C(=O)—NR'R" end group or a —Rx-O—C(=O)—NR'— linking group, with R' and R" being as defined herein, and Rx being an alkyl, cycloalkyl, aryl, alkylene glycol or any combination thereof. Preferably R' and R" are both hydrogen.

The term "polyurethane" or "oligourethane" describes a moiety that comprises at least one urethane group as described herein in the repeating backbone units thereof, or at least one urethane bond, —O—C(=O)—NR'—, in the repeating backbone units thereof.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Experimental Methods

Shore A Hardness was determined in accordance with ASTM D2240

Elastic Modulus (Modulus of Elasticity) was determined from the Strength-Strain curves, in accordance with ASTM D412

Tensile Strength was determined in accordance with ASTM D412.

Z tensile strength was determined in accordance with ASTM D412 upon printing in the Z direction.

Elongation was determined in accordance with ASTM D412.

Z Elongation was determined in accordance with ASTM D412 upon printing in the Z direction.

Tear Resistance (TR) was determined in accordance with ASTM D 624.

O-ring Tear test was performed as depicted in FIGS. 1A-C, and measures the time until a tested objected is broken.

More specifically, an object featuring two O-rings connected by a tube, as depicted in FIG. 1A, and having the following dimensions: neck length: 50 mm; X length: 110 mm; Y length: 30 mm; Z length: 10 mm, is stretched using a stretching device depicted in FIG. 1B, as depicted in FIG. 1C. The time at which the model remains stretched until it is broken is measured, and represents "static" Tear Resistance, namely, resistance to static tension in an elongated state (lower than elongation at break).

Before measurements are performed, the printed object (typically matt, printed in HS (high speed) mode is washed with water, using a jetting station, and is subjected to Conditioning and drying for 24 hours at lab conditions.

3D inkjet printing was performed using Triplex/C500 3D inkjet printing system, operated at HS mode, unless otherwise indicated.

Mold preparations were obtained according to ASTM 412. Briefly, silicone molds featuring dimensions according to ASTM 412 were used. The tested formulation was poured into the mold, and a silicon film was used to cover the mold. The formulation was cured for 3 hours in a UV chamber at room temperature, and samples were thereafter removed gently from the mold. 24 hours later, samples were measured according to ASTM D412.

Formulations were prepared by mixing all components at room temperature unless otherwise indicated. Powder components such as photo initiators were dissolved at 85 degrees for 30 minutes.

"Mill base" formulations were prepared by grinding/dispersing the silica in high concentration in one of the curable monomers (for example, at a concentration of about 20% or about 25%, by weight), to thereby obtain a "mill base" and thereafter adding mill base to the formulation so as to achieve a final concentration as indicated.

Results

Table 1 below presents the components of a reference formulation, referred to herein also as Reference A, currently used to provide a soft rubbery material characterized by Shore A hardness of about 27, by 3D Inkjet printing, the components of a soft rubbery material according to exemplary embodiments of the present invention, referred to herein as Elastomer A, and the mechanical properties of objects printed on Triplex/C500 3D inkjet printing system, operated at HS mode, using the respective formulation.

TABLE 1

|  | Reference A (Wt. %) | Elastomer A (Wt. %) |
|---|---|---|
| silica R7200 | 0 | 4 |
| Curable mono-functional monomer | 15-25 | 15-25 |
| Elastomeric mono-functional curable material | 55-65 | 55-65 |
| Elastomeric multi-functional curable material | 10-20 | 10-20 |
| Inhibitor | 0-2 | 0-2 |
| Photo-initiator | 1-5 | 1-5 |
| Surfactant | 0-0.1 | 0-0.1 |
| dispersant | 0-1 | 0-1 |
| Tensile Strength (MPa) | 1-1.1 | 2.4-3 |

TABLE 1-continued

|  | Reference A (Wt. %) | Elastomer A (Wt. %) |
|---|---|---|
| Elongation (%) | 170-220 | 260-320 |
| O-ring tear test | 15-25 minutes | 3-6 days |
| Hardness (Shore) | 27 | 30 |
| Tear Resistance (N/m) | 3500 | 5000-8000 |

Table 2 below presents the components of another reference formulation, referred to herein also as Reference B, currently used to provide a harder rubbery material characterized by Shore A hardness of about 60, by 3D Inkjet printing, the components of a harder rubbery material according to exemplary embodiments of the present invention, referred to herein as Elastomer B, and the mechanical properties of objects printed on Triplex/C500 3D inkjet printing system, operated at HS mode, using the respective formulation.

TABLE 2

|  | Reference B (Wt. %) | Elastomer B (Wt. %) |
|---|---|---|
| silica R7200 | 0 | 8 |
| Elastomeric mono-functional curable material | 30-50 | 30-50 |
| Elastomeric multi-functional curable material | 30-50 | 10-30 |
| Curable mono-functional monomer | 20-30 | 20-30 |
| Inhibitor | 0-1 | 0-1 |
| Photo-initiator | 1-5 | 1-5 |
| Dispersant | 0-2 | 0-2 |
| special black paste | 0-1 | 0-1 |
| Surfactant | 0-1 | 0-1 |
| Tensile (MPa) | 2.2 ± 0.2 | 4.04 ± 0.11 |
| Elongation (%) | 69 ± 6 | 146 ± 4 |
| Hardness (Shore) | 60 | 45-50 |
| Tear Resistance (N/m) | 4000 | 10200 ± 640 |

Additional formulations, containing similar components, and various types of silica, at various concentrations, were prepared and tested.

All formulations included the reactive and non-reactive components (except from the silica R7200) as described herein for Elastomer A, Table 1, and the following silica nanoparticles were used:

Silica R7200, which is also referred to in the art as AEROSIL® R 7200, is a methacrylate-functionalized fumed silica. Silica R7200 is an exemplary hydrophobic reactive silica according to the present embodiments.

Colloidal Silica and Silica nanopowder are exemplary hydrophilic silica. The colloidal silica used herein was obtained as silica particles dispersed in a mono-functional curable material Silica nanopowder (10-20 nm particle size) was obtained from Sigma (Cat No. 637238).

Silica R8200, which is also referred to in the art as AEROSIL® R8200, is an exemplary hydrophobic silica according to the present embodiments.

Table 3 below presents the data obtained for objects prepared in a mold from a tested formulation and for printed objects prepared from the respective formulation as described hereinabove.

TABLE 3

| Object | silica | Silica type | % silica (wt.) | Tensile Strength (MPa) | Elongation (%) |
|---|---|---|---|---|---|
| Mold | None (Reference A) | — | 0 | 1.25 | 331 |
| Mold | Aerosil ® 90 | hydrophilic | 3 | 1.45 | 357 |
| Mold | Aerosil ® R8200 | hydrophobic | 5 | 1.40 | 323 |
| Mold | Colloidal silica | hydrophilic | 4 | 1.75 | 325 |
| Mold | Colloidal silica | hydrophilic | 10 | 2.2 | 220 |
| Mold | Aerosil ® R7200 | Hydrophobic and reactive | 5 | 1.95 | 265 |
| Printed | Nanopowder (Sigma 10 nm silica) | Hydrophilic | 10 | 3.6 | 250 |
| Printed | Aerosil R7200 | Hydrophobic and reactive | 4 | 2.4-3 | 260-320 |

Table 4 below presents comparative mechanical properties of a printed object made of the formulation denoted as Reference A (see, Table 1), and the same formulation to which 4% or 10% (by weight) of colloidal silica was added.

TABLE 4

|  | Reference A | 4% colloidal silica | 10% colloidal silica |
|---|---|---|---|
| Tensile strength (MPa) | 1.05 | 1.75 | 2.2 |
| Elongation (%) | 236 | 325 | 220 |
| Z Tensile strength (MPa) | 0.45 | 1 | 1 |
| Z Tensile elongation (%) | 165 | 300 | 160 |
| O-ring tear (days) | 25 minutes | 5-6 | 5-6 |
| Shore hardness | 25 | 28 | 37 |

FIG. 7 presents the effect of various concentrations of hydrophobic, acrylic coated fumed silica, silica R7200, when added to a rubbery material formulation presented as Reference A, on the stress-strain curves of a 3D inkjet-printed object made of the respective formulation.

FIG. 8 presents the effect of various concentrations of hydrophobic, acrylic coated fumed silica, silica R7200, and of 10% (hydrophilic) colloidal silica, when added to a rubbery material formulation presented as Reference A, and denoted as "T", on the stress-strain curves of a 3D inkjet-printed object made of the respective formulation.

FIG. 9 presents a water pipe connector printed using an exemplary formulation according to some embodiments of the present invention (left tube) and a water pipe connector printed using a formulation which does not contain silica (right tube), upon being fitted on a water tube for 10 hours. As shown, the elastomeric part with no silica was torn after 10 hours, and the part containing silica remained intact, and holds for weeks (data not shown).

The data presented herein demonstrate that using submicron silica, such as (acrylic-functionalized) fumed silica or colloidal silica, in an amount of up to 15% weight percent of a UV curable formulation used to produce an elastomer by 3D printing, improves the mechanical properties of the printed part.

A particularly significant improvement is shown in the Tear Resistance of the printed rubbery object.

Printed acrylic elastomers are typically very sensitive to tear. For example, in POLYJET™ printing, printed fine parts made of acrylic elastomers are often torn during support removal by water jet. Parts that when utilized are subjected to constant elongation are also often torn after a time period of from a few minutes to a few hours.

When fine silica particles are added to the formulation, the Tear Resistance under constant elongation is increased from minutes to days, without compromising elongation. See, for example, Tables 1-4 3.

In addition to improvement of the Tear Resistance of a printed object, the addition of silica particles does not affect or even increases elongation of the printed object; results in improvement of the Elastic modulus, for example, by 2-folds, and even 3-folds; and/or results in reduced surface tackiness of the printed object, without substantially compromising other mechanical properties.

Both hydrophobic and hydrophilic silica have similar effects, with more substantial improvement demonstrated for hydrophobic silica and particularly with acrylic-functionalized silica, probably as a result of interactions with acrylic monomers in the formulation.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A formulation system comprising a curable elastomeric material and silica particles, the formulation system comprising one or more formulations,
   wherein a weight ratio of a total weight of said elastomeric curable material and a total weight of said silica particles in the formulation system ranges from 30:1 to 4:1,
   wherein an amount of said elastomeric curable material in the formulation system is at least 40%, or at least 50%, by weight,
   and wherein said elastomeric material is an acrylic elastomer;
   and the formulation system further comprises at least one elastomeric mono-functional curable material; at least one elastomeric multi-functional curable material and at least one additional mono-functional curable material.

2. The formulation system of claim 1, wherein at least a portion of said silica particles comprise functionalized silica particles.

3. The formulation system of claim 2, wherein at least a portion of said silica particles are functionalized by curable functional groups.

4. The formulation system of claim 1, wherein an amount of said silica particles in the formulation system ranges from 1 to 20, or from 1 to 15, or from 1 to 10, percent by weight.

5. The formulation system of claim 1, further comprising at least one additional curable material.

6. The formulation system of claim 1, further comprising at least one additional, non-curable material.

7. The formulation system of claim 1, wherein a total concentration of said curable mono-functional material ranges from 10% to 30%, by weight.

8. The formulation system of claim 1, wherein a total concentration of said elastomeric mono-functional curable material ranges from 50% to 70%, by weight.

9. The formulation system of claim 1, wherein a total concentration of said elastomeric multi-functional curable material ranges from 10% to 20%, by weight.

10. A kit comprising the formulation system of claim 1.

* * * * *